(12) United States Patent
Breuninger et al.

(10) Patent No.: US 7,922,193 B2
(45) Date of Patent: Apr. 12, 2011

(54) AIRBAG DEVICE

(75) Inventors: Martin Breuninger, Neu-Ulm (DE); Christian Weyrich, Neu-Ulm (DE)

(73) Assignee: Takata-Petri AG, Aschaffenberg (DE)

( * ) Notice: Subject to any disclaimer, the term of this patent is extended or adjusted under 35 U.S.C. 154(b) by 0 days.

(21) Appl. No.: 12/834,753

(22) Filed: Jul. 12, 2010

(65) Prior Publication Data

US 2010/0276915 A1    Nov. 4, 2010

Related U.S. Application Data

(62) Division of application No. 11/092,590, filed on Mar. 29, 2005.

(60) Provisional application No. 60/627,025, filed on Nov. 12, 2004, provisional application No. 60/627,178, filed on Nov. 15, 2004, provisional application No. 60/628,539, filed on Nov. 18, 2004, provisional application No. 60/646,487, filed on Jan. 25, 2005, provisional application No. 60/652,731, filed on Feb. 15, 2005.

(30) Foreign Application Priority Data

Mar. 17, 2004    (DE) .................... 10 2004 013364

(51) Int. Cl.
    *B60R 21/16*    (2006.01)
(52) U.S. Cl. .................................................... 280/730.2

(58) Field of Classification Search .................. 280/728, 280/730.2, 743.1, 743.2
See application file for complete search history.

(56) References Cited

U.S. PATENT DOCUMENTS

| | | | |
|---|---|---|---|
| 5,636,862 A * | 6/1997 | Cheung et al. | 280/743.2 |
| 5,730,464 A * | 3/1998 | Hill | 280/730.2 |
| 6,796,577 B2 * | 9/2004 | Challa et al. | 280/730.2 |
| 6,880,666 B2 * | 4/2005 | Kikuchi et al. | 180/274 |
| 7,296,822 B2 | 11/2007 | Bakhsh et al. | |

FOREIGN PATENT DOCUMENTS

| | | |
|---|---|---|
| JP | 50-012724 | 2/1975 |
| JP | 10-029480 | 2/1998 |
| JP | 2003-306121 | 10/2003 |
| JP | 2004-284572 | 10/2004 |
| WO | WO-97/06987 | 2/1997 |

* cited by examiner

*Primary Examiner* — Paul N Dickson
*Assistant Examiner* — Robert A Coker
(74) *Attorney, Agent, or Firm* — Foley & Lardner LLP

(57) ABSTRACT

An airbag comprises a bag which is bent in the shape of an arrow '<' in a deployed state, and a connection member which is arranged on a side of the bag, facing a vehicle body, and connects the upper and lower ends of the bag with each other. A longitudinal intermediate portion of the bag projects toward a vehicle occupant. A space is defined between the projecting intermediate portion and the connection member. The head of the vehicle occupant initially comes into contact with the intermediate portion and then presses the bag toward the vehicle body. Upper and lower parts of the bag which extend upward and downward from the intermediate portion cooperate with the connection member to define a triangular space.

23 Claims, 27 Drawing Sheets

FIG. 7(a) FIG. 7(b) FIG. 7(c) FIG. 7(d)
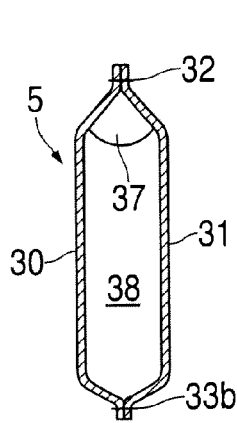
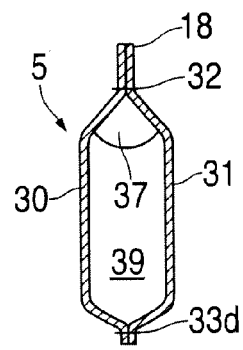
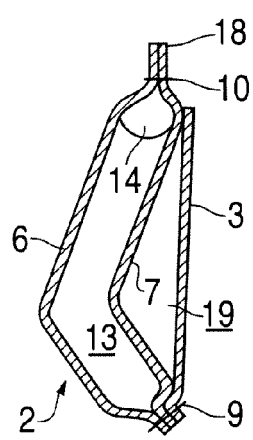
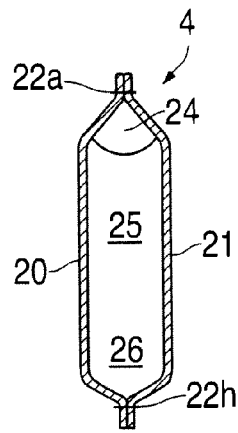
FIG. 7(e)
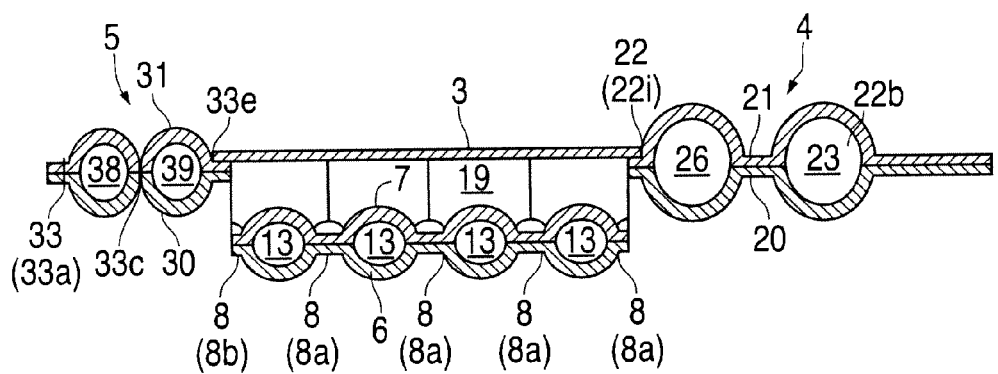

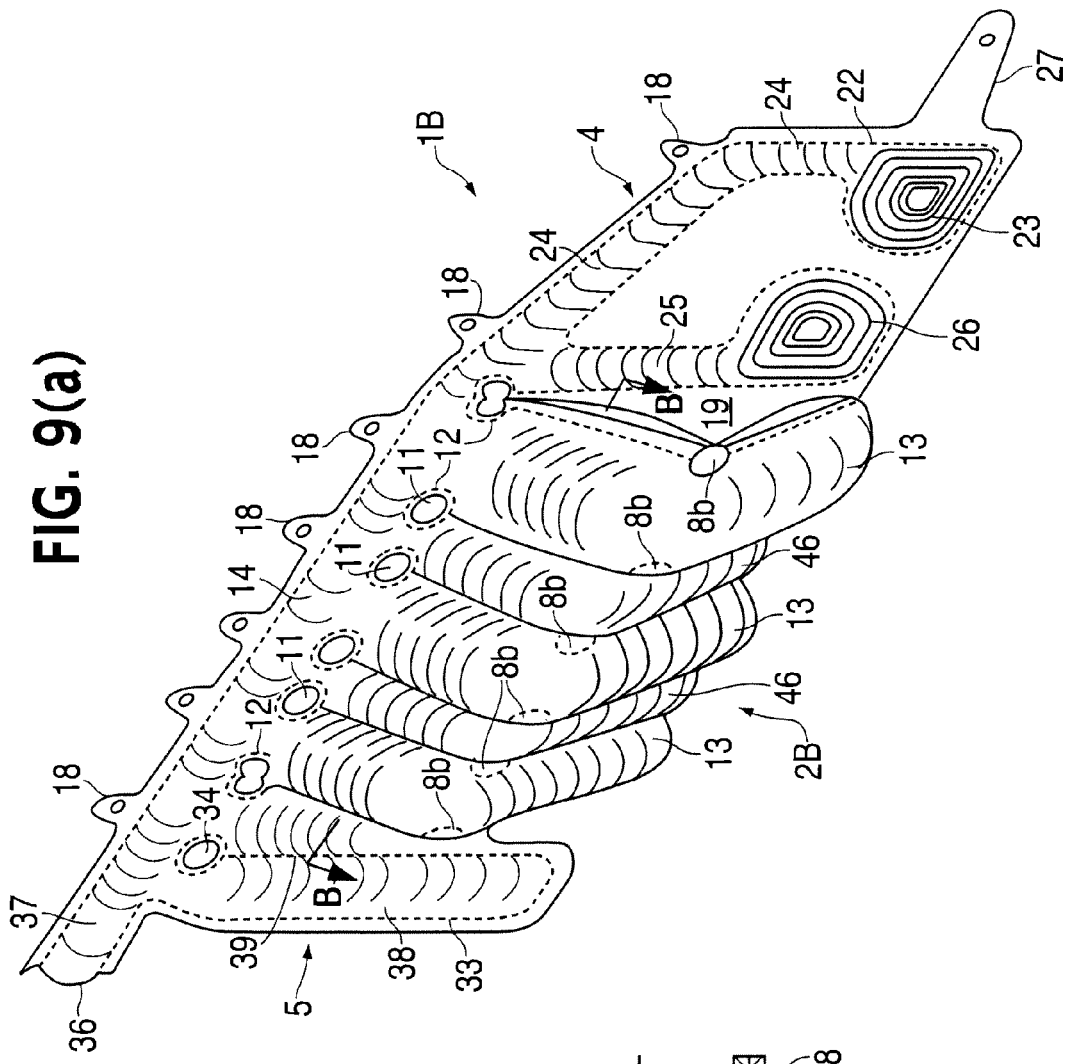
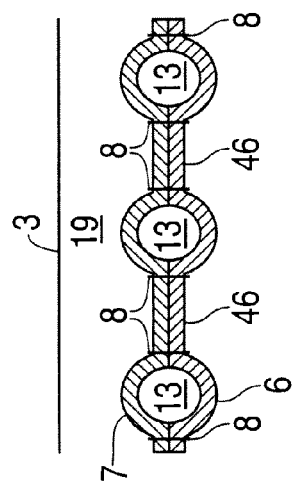

AIRBAG DEVICE

CROSS-REFERENCE TO RELATED PATENT APPLICATIONS

This application is a Divisional of U.S. application Ser. No. 11/092,590, filed Mar. 29, 2005, which claims priority to and the benefit of the following U.S. Provisional Patent Applications:

Application Ser. No. 60/627,025, filed Nov. 12, 2004;
Application Ser. No. 60/627,178, filed Nov. 15, 2004;
Application Ser. No. 60/628,539, filed Nov. 18, 2004;
Application Ser. No. 60/652,731, filed Feb. 15, 2005; and
Application Ser. No. 60/646,487, filed Jan. 25, 2005.

Each of the foregoing applications are incorporated by reference herein.

BACKGROUND

The present invention relates to an airbag for protecting the head of a vehicle occupant, and more particularly, to a head protection airbag which is constructed so as to be deployed along a side door pillar and the like upon a side impact or a roll-over of a vehicle. Also, the present invention relates to a head protection airbag device having the head protection airbag.

As is generally known in the art, an airbag for protecting the head of a vehicle occupant is installed adjacent to a corner of a vehicle interior where a roof panel and a side panel are joined to each other, and is constructed so as to be deployed along a side door window and the like when gas is introduced therein from an inflator through a gas inlet.

International Publication No. WO 97/06987 (hereby incorporated by reference herein in its entirety) discloses a side airbag which is deployed on the side of a vehicle occupant. In the side airbag, a longitudinal intermediate portion of a bag is constricted by a seam which extends in a transverse direction (a lengthwise direction of a vehicle body: this also applies to the following description), so that the bag is divided into an upper portion and a lower portion. A panel is positioned along a portion of the airbag which faces the vehicle occupant. The upper and lower portions of the panel are respectively connected to the upper and lower portions of the bag. When the bag is inflated, the panel is tightly stretched. Then, as the shoulder of the occupant comes into contact with the bag, the panel pulls the upper portion of the bag downward. As such, the upper portion of the bag is pulled toward the vehicle occupant to protect the head of the vehicle occupant.

Japanese Unexamined Patent Application Publication No. 2003-72500 discloses an airbag for protecting the head of a vehicle occupant (hereby incorporated by reference herein in its entirety). In this type of airbag, supporting fabric is positioned on the sides of a bag which faces both a vehicle occupant and a vehicle body. The upper and lower edges of the supporting fabric are coupled to the upper and lower edges of the bag.

In the case where the airbag disclosed in International Publication No. WO 97/06987, which has the panel positioned so as to face the vehicle occupant, is employed as a head protection airbag, when the head of the vehicle occupant comes into contact with the panel, since the lower portion of the bag is also pulled toward the vehicle occupant, a tensile force is not sufficiently generated in the panel, and therefore, the panel cannot properly protect the head.

In the case of the head protection airbag disclosed in Japanese Unexamined Patent Application Publication No. 2003-72500, the supporting fabric contributes to the protection of the occupant's head. However, in order to ensure that the airbag or the supporting fabric immediately catches the head of the vehicle occupant, the thickness of a connection member of the airbag needs to be increased, which consequently increases the size of the airbag. As a result, it is necessary to employ an inflator having a large capacity.

Accordingly, it is an object of the present invention to provide a head protection airbag which eliminates the need to employ an inflator having a large capacity and which is capable of immediately protecting the head of a vehicle occupant, thereby sufficiently absorbing a shock applied to the head of the vehicle occupant, and a head protection airbag device having the head protection airbag.

SUMMARY

One embodiment of the invention relates to an airbag device. The airbag device comprises an airbag having first and second side surfaces and upper and lower ends. The airbag is configured to inflate into a position wherein an enveloped space is defined by the first side surface and a plane containing the upper and lower ends of the airbag. The ratio of the volume of the enveloped space over the volume of the inflated airbag is greater than approximately 1.0.

According to another embodiment of the present invention, an airbag device for protecting a vehicle occupant is provided. The airbag device comprises an airbag having first and second side surfaces and upper and lower ends, and a member connecting the upper and lower ends of the airbag. The airbag is configured to inflate into a position wherein an enveloped space is defined by the first side surface and a plane containing the connecting member.

According to another embodiment of the present invention, an occupant safety system is provided. The occupant safety system comprises an airbag having first and second side surfaces and upper and lower ends, a member connecting the upper and lower ends of the airbag, and an inflator for inflating the airbag. The airbag is configured to inflate into a position wherein an enveloped space is defined by the first side surface and a plane containing the connecting member.

According to yet another embodiment of the present invention, an airbag device is provided. The airbag device comprises an airbag having first and second side surfaces, upper and lower ends and an intermediate portion, and a member connecting the upper and lower ends of the airbag. The airbag is configured to inflate into a position wherein an enveloped space is defined by the first side surface and a plane containing the connecting member.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 7(a), 7(b), 7(c), 7(d) and 7(e) are cross-sectional views taken along the lines A-A, B-B, C-C, D-D and E-E of FIG. 6.

FIGS. 9(a) and 9(b) are explanatory views illustrating another embodiment of the present invention.

FIG. 14(a) is a perspective view and FIG. 14(b) is a side view of the airbag shown in FIG. 14(a).

FIG. 15(a) is a perspective view. FIG. 15(b) is a side view taken along line A-A in FIG. 15(a). FIG. 15(c) is a view taken along line B-B in FIG. 15(a).

FIG. 16(a) is a view of an airbag with a connecting member facing the occupant. FIG. 16(b) is a view of an airbag positioned on a lower dashboard in a vehicle. FIG. 16(c) is a view of an airbag positioned on a roof line of a vehicle.

FIG. 17(a) is a view of an airbag with a connecting member facing the vehicle body. FIG. 17(b) is a view of an airbag with the connecting member facing away from the vehicle body.

FIG. 29(a) is a perspective view and FIG. 29(b) is a side view.

FIG. 32(a) is a perspective view of an airbag with tethers. FIG. 32(b) is an end-view of a cross-section taken along line A-A in FIG. 32(a).

DETAILED DESCRIPTION

Figure 1A:
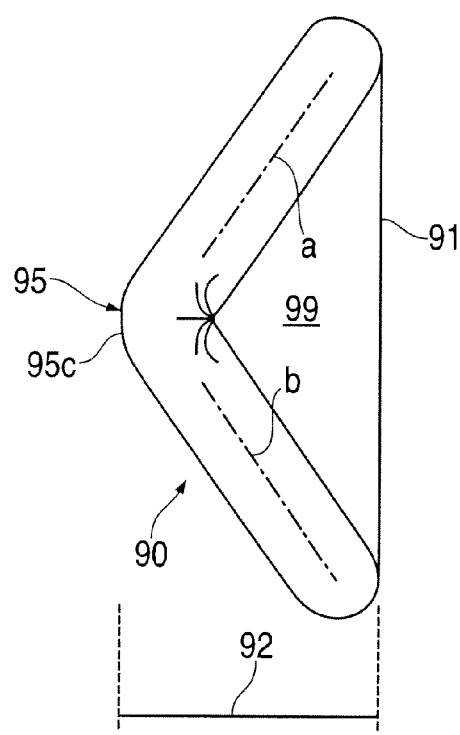
FIGS. 1(a) and 1(b) are diagrammatic side views illustrating deployed states of head protection airbags in accordance with embodiments of the present invention.

According to a first aspect of the present invention, there is provided a head protection airbag deployable along a side surface of a vehicle interior, comprising a bag which is positioned so as to face a vehicle occupant and is deployed when gas is introduced therein from an inflator, and a connection member which is positioned on a side of the bag, facing a vehicle body, and connects upper and lower ends of the bag with each other, wherein, when the bag is deployed, a longitudinal intermediate portion of the bag projects toward the vehicle occupant, and the connection member is coupled to the upper and lower ends of the bag in a tensed state, such that a space is defined between the longitudinal intermediate portion of the bag and the connection member.

The head protection airbag according to a second aspect of the present invention is characterized in that, in the first aspect, the intermediate portion is positioned lower than the middle of the bag in the longitudinal direction.

The head protection airbag according to a third aspect is characterized in that, in the first and second aspects, at least in a front part of the bag, the intermediate portion is gradually decreased in height toward a front end of the bag.

The head protection airbag of a fourth aspect is characterized in that, in any one of the first to third aspects, when the bag is deployed, a thicknesswise center line of an upper part of the bag which extends upward from the intermediate portion gradually approaches the connection member in an upward direction, and a thicknesswise center line of a lower part of the bag which extends downward from the intermediate portion gradually approaches the connection member in a downward direction.

The head protection airbag of a fifth aspect is characterized in that, in the fourth aspect, the deployed bag has a substantially '<'-shaped or 'L'-shaped configuration when viewed from the side.

The head protection airbag of a sixth aspect is characterized in that, in any one of first to fifth aspects, the bag comprises a first panel which faces the vehicle occupant and a second panel which faces the vehicle body, the first and second panels being coupled to each other in such a way so as to define between them at least one chamber into which gas from the inflator is introduced; and a longitudinal length of the first and second panels is greater than that of the connection member.

The head protection airbag of a seventh aspect is characterized in that, in the sixth aspect, the first and second panels are coupled to each other by a plurality of linear coupling portions which extend in a longitudinal direction, and chambers are defined between the linear coupling portions so as to extend in the longitudinal direction.

The head protection airbag of an eighth aspect is characterized in that, in seventh aspect, at the longitudinal intermediate portion of the bag, each of the chambers has a width which is less than that of each of the upper and lower parts of the bag.

The head protection airbag of a ninth aspect is characterized in that, in the sixth aspect, the first and second panels are coupled to each other at the intermediate portion by a linear coupling portion which extends in a transverse direction, and chambers are defined above and below the linear coupling portion.

The head protection airbag of a tenth aspect is characterized in that, in any one of the first to ninth aspects, the connection member comprises a panel or a tether belt.

The head protection airbag of an eleventh aspect is characterized in that, in any one of the first to tenth aspects, the connection member is constructed such that its longitudinal length is increased when a tensile force above a predetermined level is applied thereto in the longitudinal direction.

The head protection airbag of a twelfth aspect is characterized in that, in any one of the first to ninth aspects, the connection member comprises a panel; a front protruding portion which extends forward from a front end of the bag is connected to a front end of the panel; an inflation chamber to be inflated by gas from the inflator is disposed in the front protruding portion so as to extend in the longitudinal direction; and a lower portion of a rear end of the front protruding portion is connected to a lower portion of the front end of the bag.

The head protection airbag of a thirteenth aspect is characterized in that, in any one of the first to ninth aspects and the twelfth aspect, the connection member comprises a panel; a rear protruding portion which extends in a rear direction of the bag is connected to a rear end of the panel; an inflation chamber to be inflated by gas from the inflator is disposed in the rear protruding portion so as to extend in the longitudinal direction; and a lower portion of a front end of the rear protruding portion is connected to a lower portion of the rear end of the bag.

The head protection airbag of a fourteenth aspect is characterized in that, in any one of the first to ninth aspects, the connection member comprises a panel; a front closing member is installed so as to close a space between front edges of the connection member and the bag, and a rear closing member is installed so as to close a space between rear edges of the connection member and the bag, whereby the space defined between the bag and the connection member is closed so as to form a space; and a venting part is formed so as to communicate the space with the outside.

The head protection airbag device of a fifteenth aspect comprises the head protection airbag according to any one of the first to fifteenth aspects and an inflator which generates gas for inflating the head protection airbag.

When a vehicle occupant comes into contact with the head protection airbag according to the present invention, the intermediate portion of the bag protects the head of the vehicle occupant while gradually withdrawing toward the vehicle body. By this withdrawal, a force is applied to the bag such that the upper part and the lower part of the bag are diverged from each other. The force is opposed by the connection member. Therefore, the intermediate portion of the bag gradually withdraws toward the vehicle body while protecting the head of the vehicle occupant. At this time, the shock applied to the head of the vehicle occupant is absorbed. After the intermediate portion which has caught the head of the vehicle occupant comes into contact with the vehicle body, the bag is depressed to absorb the shock applied to the head of the vehicle occupant.

Since the projection of the intermediate portion of the bag projects toward the vehicle occupant, the head of the occupant can be immediately caught by the bag and a shock can be absorbed throughout an extended period of time. While the bag withdraws, the reaction force which the head receives from the bag is relatively small. As a result, when the head of the vehicle occupant is initially caught by the bag, the reaction force that is applied to the head of the occupant from the bag is small.

In the head protection airbag of the second aspect, even when a vehicle occupant has a low sitting height, the head of the vehicle occupant can be securely protected by the projecting intermediate portion of the bag.

As the sitting height of a vehicle occupant decreases, the vehicle occupant has a tendency to place the seat to a more forward position. In the head protection airbag of the third aspect, even in the case where a vehicle occupant having a low sitting height is in the forward position, the head of the vehicle occupant can be securely protected caught by the projecting intermediate portion of the bag.

In the head protection airbag of the fourth aspect, when the vehicle occupant comes into contact with the bag and a biasing force is applied to the intermediate portion of the bag, the biasing force is opposed by the reaction force from the upper part of the bag and the reaction force from the lower part of the bag.

In particular, as in the fifth aspect, if the deployed bag is substantially arrow '<'-shaped or 'L'-shaped when viewed from the side, the bag and the connection member define a substantially triangular space. Therefore, since it is difficult to deform the bag by the biasing force applied from the vehicle occupant, the shock from the vehicle occupant can be sufficiently absorbed.

By the head protection airbag of the sixth aspect, because the bag is pulled by a connection member, the bag is deployed to define the substantially triangular space.

By the head protection airbag of the seventh aspect, it is possible to decrease the thickness of the bag upon deployment.

By the head protection airbag of the eighth aspect, when the bag is deployed, each chamber is bent at a region where its width is reduced.

In the ninth aspect, in the present invention, the first and second panels can be coupled to each other by the linear coupling portion which extends in the transverse direction. In this case, when the panels are deployed, the bag is bent along the linear coupling portion.

As described in the tenth aspect, the connection member may comprise a panel or a tether belt. If the connection member comprises the panel, the forces generated when the bag is deployed, for diverging the upper and lower parts of the bag from each other, are imposed on the entire bag. If the connection member comprises the tether belt, it is possible to reduce the weight of the airbag.

In the case of the eleventh aspect, regarding the vertical length, that is, the increase in height of the connection member, the shock is absorbed more effectively.

In the head protection airbag of the twelfth and thirteenth aspects, since the front extending section and the rear extending section are inflated, when the vehicle occupant comes into contact with the front or rear extending section, a shock can be absorbed by the corresponding section. Also, when the front and rear extending sections are deployed downward, since the bag is pulled downward, the deployment of the bag can be quickly implemented.

In the case of the head protection airbag of the fourteenth aspect, when the bag withdraws, because air existing in the space defined behind the bag is slowly discharged to the outside, the shock from the vehicle occupant can be reliably absorbed.

Hereafter, preferred embodiments of the present invention will be described with reference to the attached drawings.

In the description given below, a transverse direction means a forward and rearward direction of a vehicle in which a head protection airbag according to the present invention is installed, and a longitudinal direction means an upward and downward direction of the vehicle in which the head protection airbag according to the present invention is deployed in a vehicle interior.

All head protection airbags (hereinafter, simply referred to as "airbags") according to various embodiments of the present invention as will be sequentially described below in detail are installed along a side portion of a roof panel, for example, to extend from an A pillar to a C pillar in their folded state, and are inflated and deployed in the shape of a curtain along a side surface of the vehicle interior when a side impact or a roll-over of the vehicle occurs, to protect the head of a vehicle occupant seated on a front seat or a rear seat in the vehicle interior, thereby preventing the head of the vehicle occupant from colliding with the side surface of the vehicle interior or the vehicle occupant from being ejected through a window of the vehicle.

An airbag 90 shown in FIG. 1(a) comprises a bag 95 which is bent in the shape of '<' in an inflated state, and a connection member 91 which is positioned on a side of the bag 95, facing a vehicle body, and connects upper and lower portions of the bag 95 with each other. A longitudinal intermediate portion of the bag 95 which substantially corresponds to the middle of the bag 95 projects toward the vehicle occupant. The distance from the connection member 91 to the projecting end of the bag 95 is designated by reference numeral 92. A space 99 is defined between the vertical projecting intermediate portion 95c and the connection member 91.

Figure 1B:
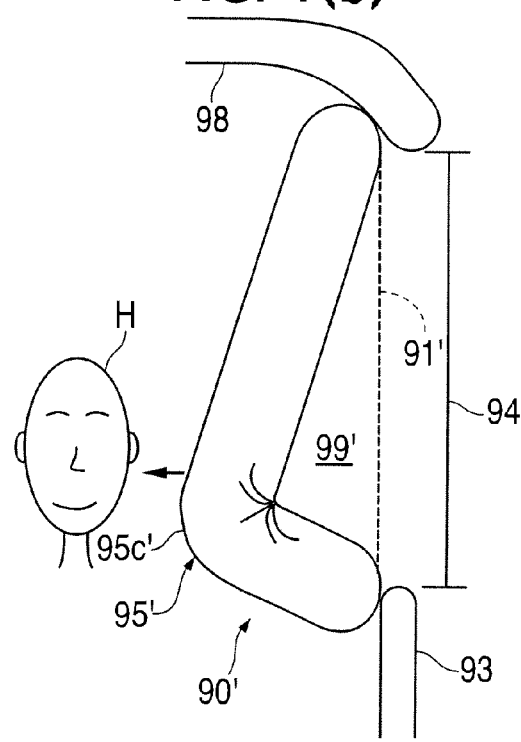

In a bag 95' of an airbag 90' shown in FIG. 1(b), a projecting intermediate portion 95c' is positioned lower than the middle of the bag 95'. The bag 95' is 'L'-shaped when viewed from the side.

The connection members 91 and 91' of the bags 95 and 95' are made of a fabric (a panel), a belt (a tether), a mesh, etc. In FIG. 1(b), in addition to a door 93, a window 94 and a roof panel 98, the head H of the vehicle occupant which is caught by the intermediate portion 95c' of the bag 95' is also illustrated.

In a state in which each bag 95 and 95' is inflated, a thicknesswise center line 'a' of an upper portion of each bag which extends upward from the bent portion of each bag gradually approaches the connection member 91 in an upward direction, and a thicknesswise center line 'b' of a lower portion of the bag which extends downward from the bent portion of each bag gradually approaches the connection member 91 in a downward direction.

Figure 2A:
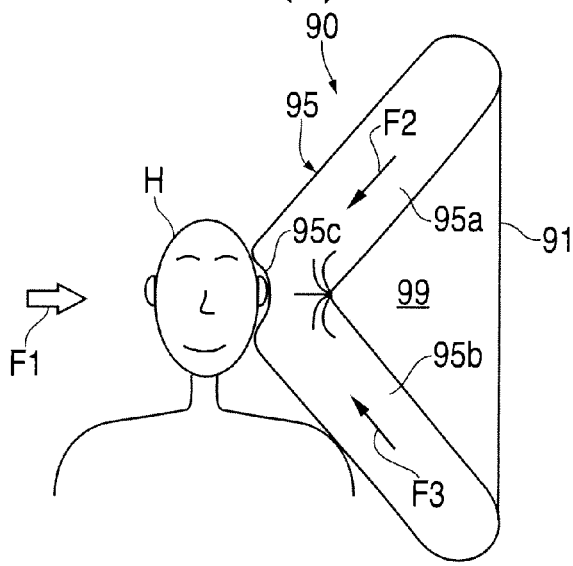
FIGS. 2(a), 2(b) and 2(c) are views explaining the operation of the airbag shown in FIG. 1(a).
Figure 2B:
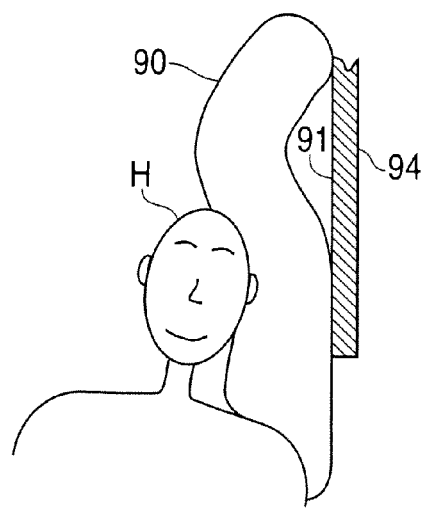

FIGS. 2(a) and 2(b) are views illustrating a state in which the head H and the shoulder of the vehicle occupant are protected by the airbag 90 shown in FIG. 1(a).

Referring to FIG. 2(a), the head H of the vehicle occupant initially comes into contact with the intermediate portion 95c of the bag 95 so as to push the bag 95 toward the vehicle body. The upper and lower portions 95a and 95b of the bag 95 and the connection member 91 define a triangular configuration.

Accordingly, in opposition to a force F1 which is applied by the head H to the bag 95 to push the bag 95 toward the vehicle body, reaction forces F2 and F3 are generated in the upper and lower parts 95a and 95b of the bag 95, so as to act in opposite directions which are parallel to the upper and lower parts 95a and 95b. As a result, the head H is applied with the sum of the reaction forces F2 and F3 and is only gradually moved to push the bag 95 into the space 99. In this way, a shock to the head H is gradually absorbed. Consequently, the speed at which the head H moves toward the vehicle body gradually decreases.

As a result, as shown in FIG. 2(b), the bag 95 comes into contact with the window 94 or the pillar (not shown) via the connection member 91, and is then depressed against the vehicle body by the head.

In a state shown in FIG. 2(b), since the speed at which the head H moves toward the vehicle body is significantly decreased, the reaction force which is applied by the bag 95 to the head H is small.

Figure 2C:
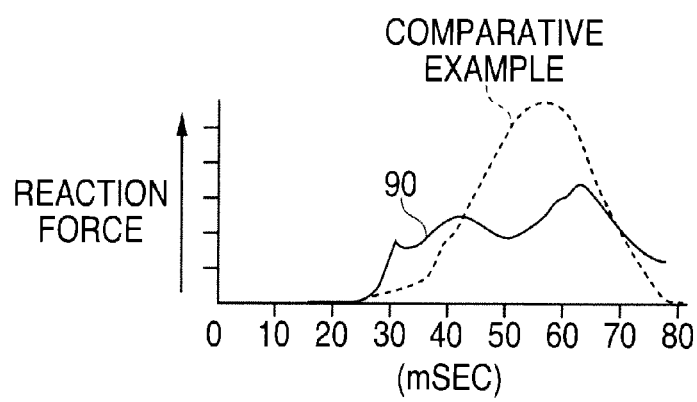

FIG. 2(c) is a graph showing changes in the reaction force which is applied to the head H by the airbag, with the lapse of time after a side impact of a vehicle occurs.

In the case of the airbag 90, due to the fact that the intermediate portion 90c initially catches the head H, although the reaction force initially increases, after the initial stage, only a relatively low reaction force is generated.

On the contrary, in a comparative example in which an airbag is positioned adjacent to a window, because the head depresses the airbag from the start, a maximum value of the reaction force which is applied to the head from the airbag becomes greater than that in the case of the airbag 90.

Next, a specific example of a head protection airbag according to the present invention will be described with reference to FIGS. 3 through 7.

The airbag 1 comprises a bag 2 which is inflated to project toward the vehicle occupant, a connection member 3 which is positioned at a side of the bag 2, facing the vehicle body, and is composed of a panel connecting the upper and lower portions of the bag 2 with each other, a front protruding portion 4 which is connected to the connection member 3 so as to protrude forward, and a rear protruding portion 5 which is connected to the connection member 3 so as to protrude rearward. When the bag 2 is inflated, a space 19 is defined between the bag 2 and the connection member 3 (see FIGS. 6 and 7).

The bag 2 is formed by sewing a first panel 6 (see FIG. 7) which faces the vehicle occupant with a second panel 7 which faces the connection member 3 (see FIG. 7). Sewing is implemented along a plurality of longitudinal sewing lines 8, a lower sewing line 9 which extends along the lower edges of the panels 6 and 7, and an upper sewing line 10 which extends along the upper edges of the panels 6 and 7.

Slightly below the upper ends of the panels 6 and 7, openings 11 are defined through the panels 6 and 7 and the connection member 3, and sewing is implemented around each opening 11 along a circular sewing line 12. The longitudinal sewing line 8 is connected to the circular sewing line 12.

A plurality of longitudinally inflatable chambers 13 are defined between the longitudinal sewing lines 8. A tunnel-shaped gas passage (a duct) 14 is defined between the circular sewing lines 12 and the upper sewing line 10 to extend along the upper sewing line 10.

Furthermore, each of longitudinal intermediate portions of the longitudinal sewing lines 8 is formed with a circular sewing line portion 8a or a semi-circular sewing line portion 8b. Between the circular sewing line portions 8a or between the circular and semi-circular sewing line portions 8a and 8b, the chamber 13 has a decreased width.

A plurality of tab pieces 18 are formed on an upper edge of the airbag 1. The tab pieces 18 are fastened to a roof side rail or the A pillar of the vehicle body by means of bolts, rivets, etc.

Figure 5:
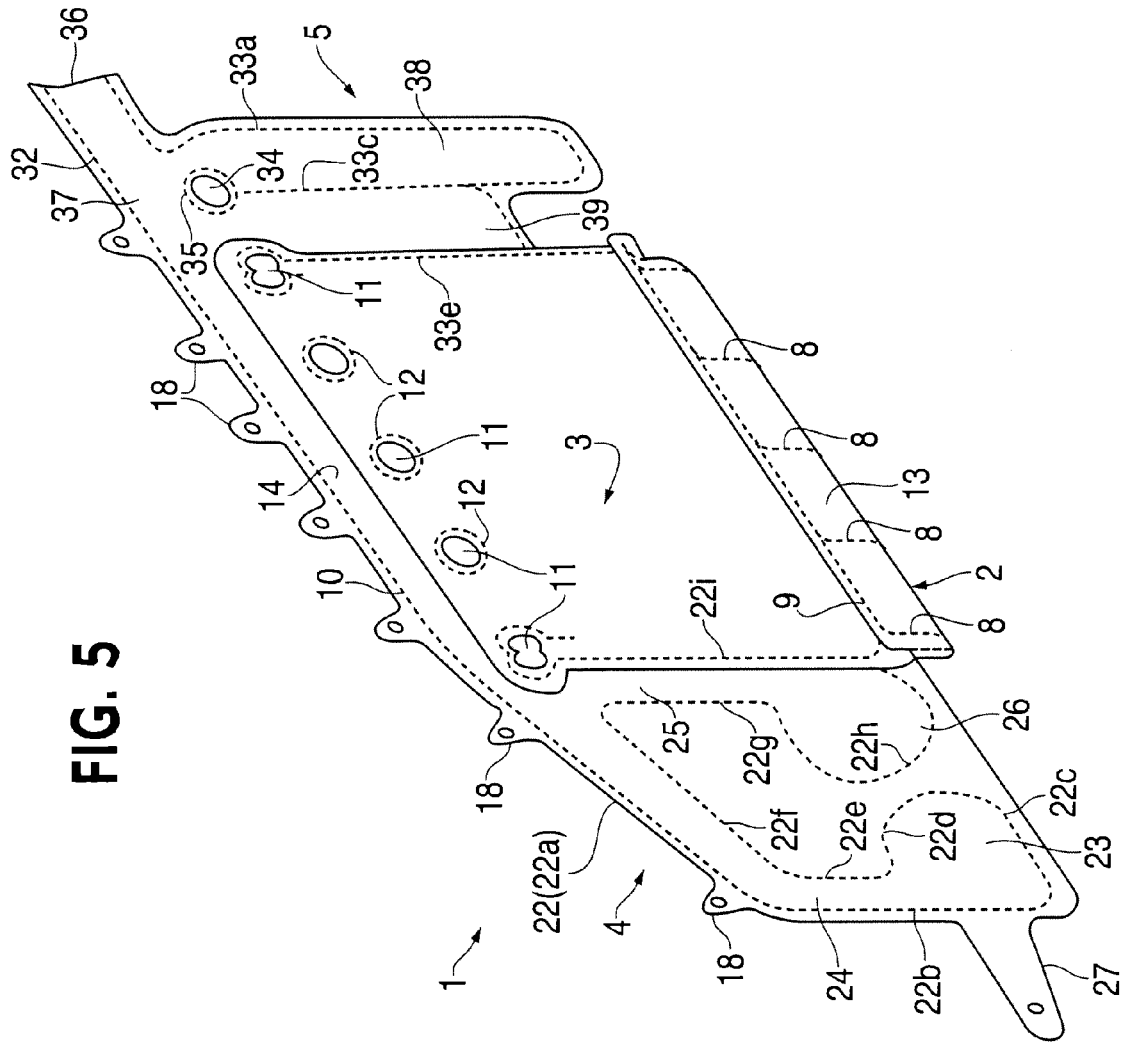
FIG. 5 is a perspective view illustrating the head protection airbag which is viewed from the side of a vehicle body.

The connection member 3 comprises a panel. As shown in FIG. 5, an upper portion of the connection member 3 is sewn to the panels 6 and 7 by the circular sewing lines 12, and a lower edge of the connection member 3 is sewn to the panels 6 and 7 by the lower sewing line 9.

The length of the connection member 3 which is measured from the circular sewing line 12 to the lower sewing line 9 is smaller than that of the panels 6 and 7 which are measured from the circular sewing line 12 to the lower sewing line 9.

As shown in FIG. 7(e), the front protruding portion 4 is formed by sewing a vehicle occupant-side panel 20 and a vehicle body-side panel 21 to each other along a sewing line 22. In this preferred embodiment of the present invention, an upper edge of the panel 20 is connected to the first panel 6, and an upper edge of the panel 21 is connected to the second panel 7.

As shown in FIGS. 3 through 6, the sewing line 22 comprises a sewing line portion 22a which extends along the upper edges of the panels 20 and 21, a sewing line portion 22b which extends along the front edges of the panels 20 and 21, a sewing line portion 22c which extends along lower front edges of the panels 20 and 21, a sewing line portion 22d for defining a chamber 23, sewing line portions 22e and 22f for forming a duct 24, sewing line portions 22g and 22i for forming a duct 25, and a sewing line portion 22h for defining a chamber 26.

The sewing line portion 22i sews the panels 20 and 21 and the connection member 3 to one another. The sewing line portion 22i extends upward along the rear edge of the front protruding portion 4 and is connected to the circular sewing line 12 which is formed at the front portion of the bag 2.

The duct 24 is connected to the duct 14 and extends from the upper edge of the front protruding portion 4 to the front edge thereof. The duct 24 communicates with the chamber 23. The duct 25 branches from a proximal end of the duct 24 and extends downward along the rear edge of the front protruding portion 4. The duct 25 communicates with the chamber 26.

A strap 27 extends from the lower portion protruding portion 4 to the front thereof. The strap 27 is connected to the A pillar of the vehicle body and functions so as to apply a tensile force to the lower edge of the inflated airbag 1.

The rear protruding portion 5 is formed by sewing a vehicle occupant-side panel 30 and a vehicle body-side panel 31 (see FIG. 7) along sewing lines 32 and 33. The sewing line 32 extends along the upper portions of the panels 30 and 31 and is connected to the sewing line 10. The upper portion of the panel 30 is connected to the first panel 6, and the upper portion of the panel 31 is connected to the second panel 7.

The sewing line 32 comprises three longitudinal sewing line portions 33a, 33c and 33e, and sewing line portions 33b and 33d which connect lower portions of the longitudinal sewing line portions 33a, 33c and 33e with one another. Chambers 38 and 39 are defined between the sewing line portions 33a and 33c and between the sewing line portions 33c and 33e.

The sewing line portion 33e sews the panels 30 and 31 and the connection member 3 to one another.

An upper portion of the rear protruding portion 5 defines a gas inlet 36 which slightly projects rearward. A duct 37 is formed along the upper sewing line 32. The duct 37 communicates with the duct 14 and the respective chambers 38 and 39.

The front end of the airbag 1 is positioned adjacent to the A pillar, the rear end of the airbag 1 is positioned adjacent to the B pillar, and the upper edge of the airbag 1 is positioned to the roof side panel. The airbag 1 is installed in a receiving space (not shown) for the airbag 1, defined in the vehicle body, in a state in which it is folded into an elongated configuration and extends in the transverse direction of the vehicle body. An inflator or a gas conduit is connected to the gas inlet 36.

The folded airbag 1 which is received in the receiving space of the vehicle body is covered by a covering element such as a pillar trim, a roof trim, and the like. The covering element is pressed and opened by the airbag 1 when the airbag 1 is inflated, to allow the deployment of the airbag 1 into the vehicle interior.

Herein below, the operation of a head protection airbag device having the airbag 1 constructed as mentioned above will be described.

If a side impact or a roll-over of a vehicle occurs, the inflator is actuated, and gas is supplied through the ducts 37, 14, 24 and 25 into the respective chambers 38, 39, 13, 26 and 23 of the airbag 1, whereby the airbag 1 is inflated. The airbag 1 opens the covering element, is deployed downward in the shape of a curtain along the side surface of the vehicle interior, and is fully inflated between the vehicle occupant and the vehicle body as shown in FIG. 6 to prevent the vehicle occupant from being brought into direct contact with the pillar, windows, etc. and from being ejected out of the vehicle.

In the head protection airbag 1 according to the present invention, the deployment of the airbag 1 can vary depending on the location and size of the inflator pipe outlets in the airbag 1, amongst other things.

The bag 2 is pulled downward by the forward and rear protruding portions 4 and 5 as described above. As gas is supplied into the respective chambers 13 through the duct 14, the bag 2 is inflated. Because the upper and lower portions of the bag 2 are connected to the connection member 3, the longitudinal intermediate portion of the bag 2 projects toward the vehicle occupant. In this preferred embodiment of the present invention, since the intermediate portions of the respective chambers 13 are decreased in width due to the presence of the circular and semi-circular sewing line portions 8a and 8b, as can be readily seen from FIG. 7(c), while being inflated, the bag 2 is bent substantially in the shape of an arrow '<' along a line connecting the circular and semi-circular sewing line portions 8a and 8b. The space 19 is defined between the bag 2 and the connection member 3. The space 19 is opened to the atmosphere at the front and rear ends of the bag 2.

Figure 6:
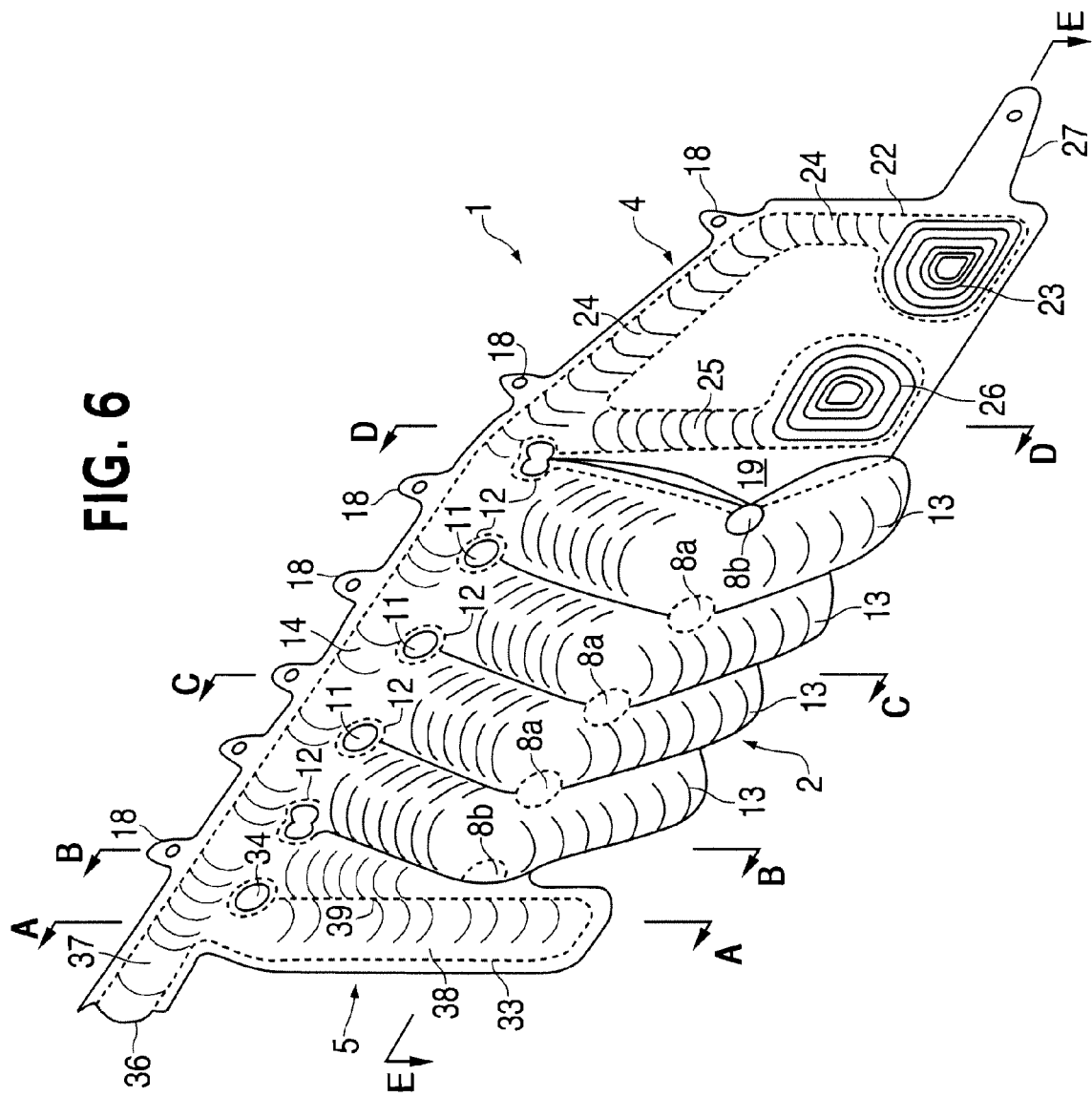
FIG. 6 is a perspective view illustrating a state in which the head protection airbag is deployed and is viewed from the side of the vehicle occupant.

The vehicle occupant is protected by the airbag deployed and inflated as shown in FIG. 6. As in the case of FIG. 2, since the head of the vehicle occupant comes into contact with and is protected by the intermediate portion of the bag 2, a shock applied to the vehicle occupant can be sufficiently absorbed, and as shown in FIG. 2(c), a maximum value of the reaction force which is applied to the vehicle occupant from the bag 2 is small.

Figure 3:
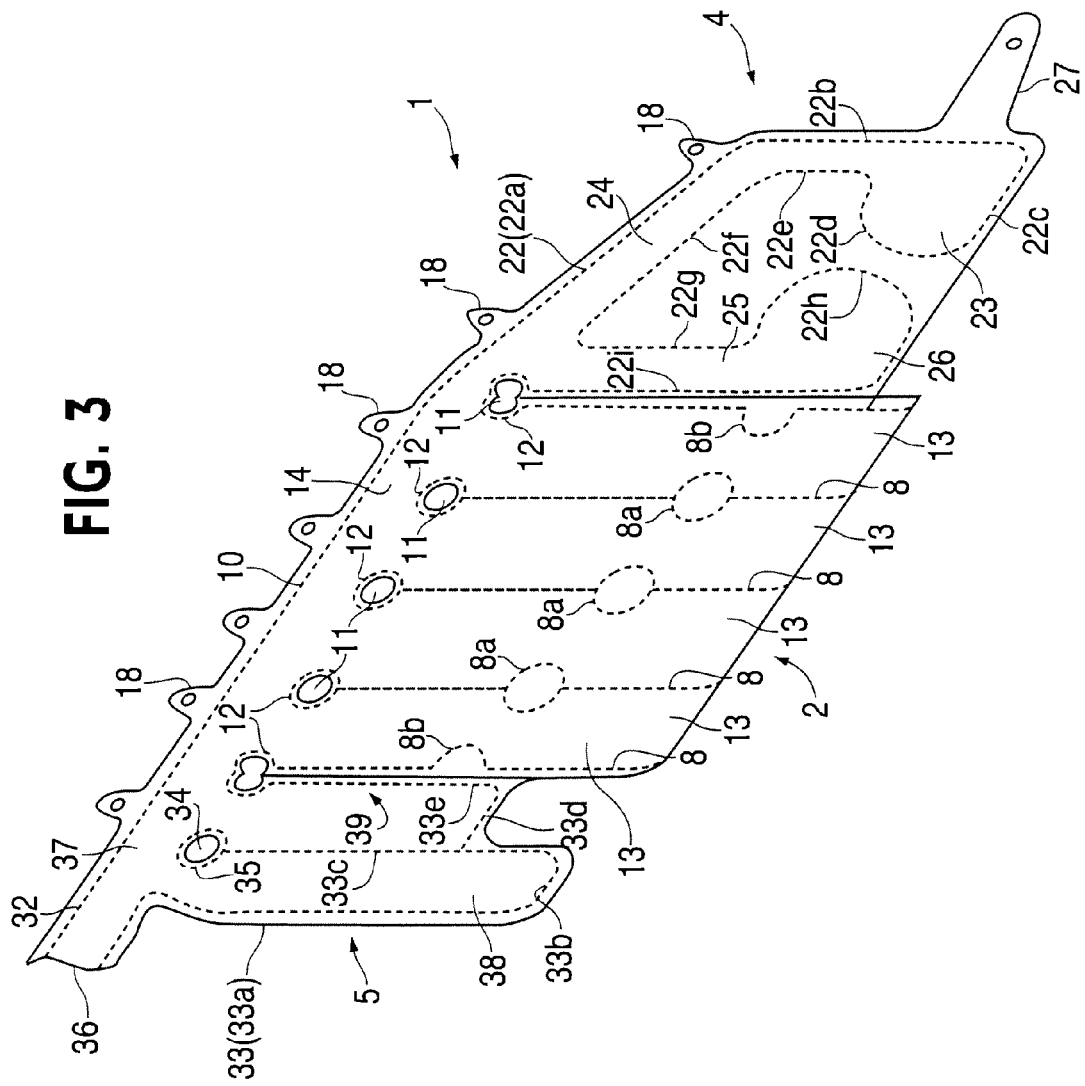
FIG. 3 is a perspective view illustrating a head protection airbag in accordance with an embodiment of the present invention, which is viewed from the side of a vehicle occupant and is maintained in an un-deployed state.
Figure 4:
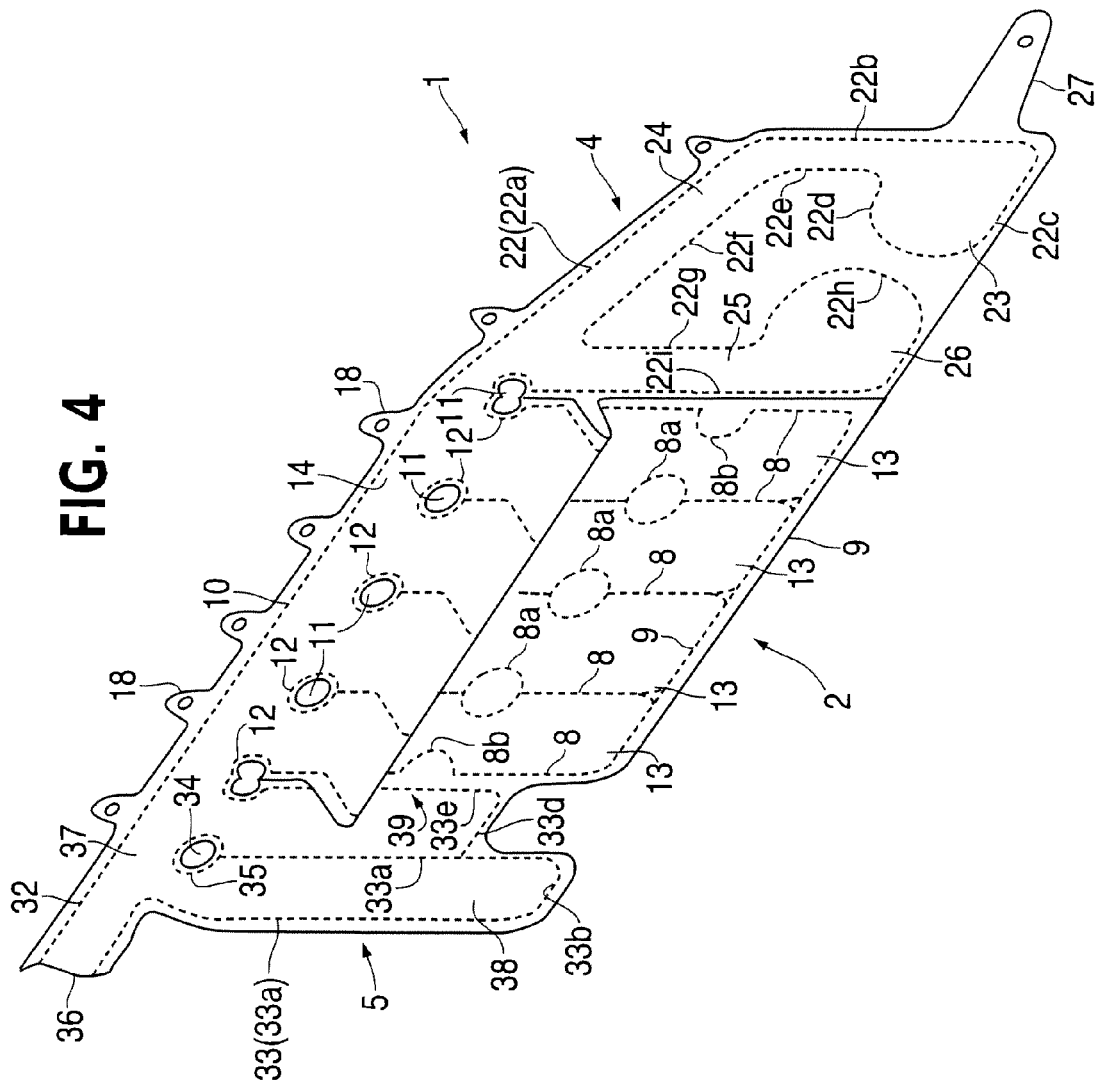
FIG. 4 is a perspective view illustrating a state in which a bag of the head protection airbag is pulled upward.

Moreover, in this preferred embodiment of the present invention, as shown in FIGS. 3 and 4, the circular and semi-circular sewing line portions 8a and 8b are gradually decreased in heights toward the front side of the vehicle. Due to this fact, the bending portion of the bag 2 is also gradually decreased in height toward the front side of the vehicle. This is to ensure that, since a vehicle occupant having a low sitting height has a tendency to place a seat to a more forward position, the bending portion of the bag 2 has a decreased height adjacent to the front side of the bag 2 to securely protect the head of the vehicle occupant. In this regard, a vehicle may be adopted, wherein the left height of a seat cushion is automatically raised when the vehicle occupant slides the seat forward. Therefore, in this case, it is preferred that the bending line of the bag 2 has the same height in the transverse direction.

Figure 8A:
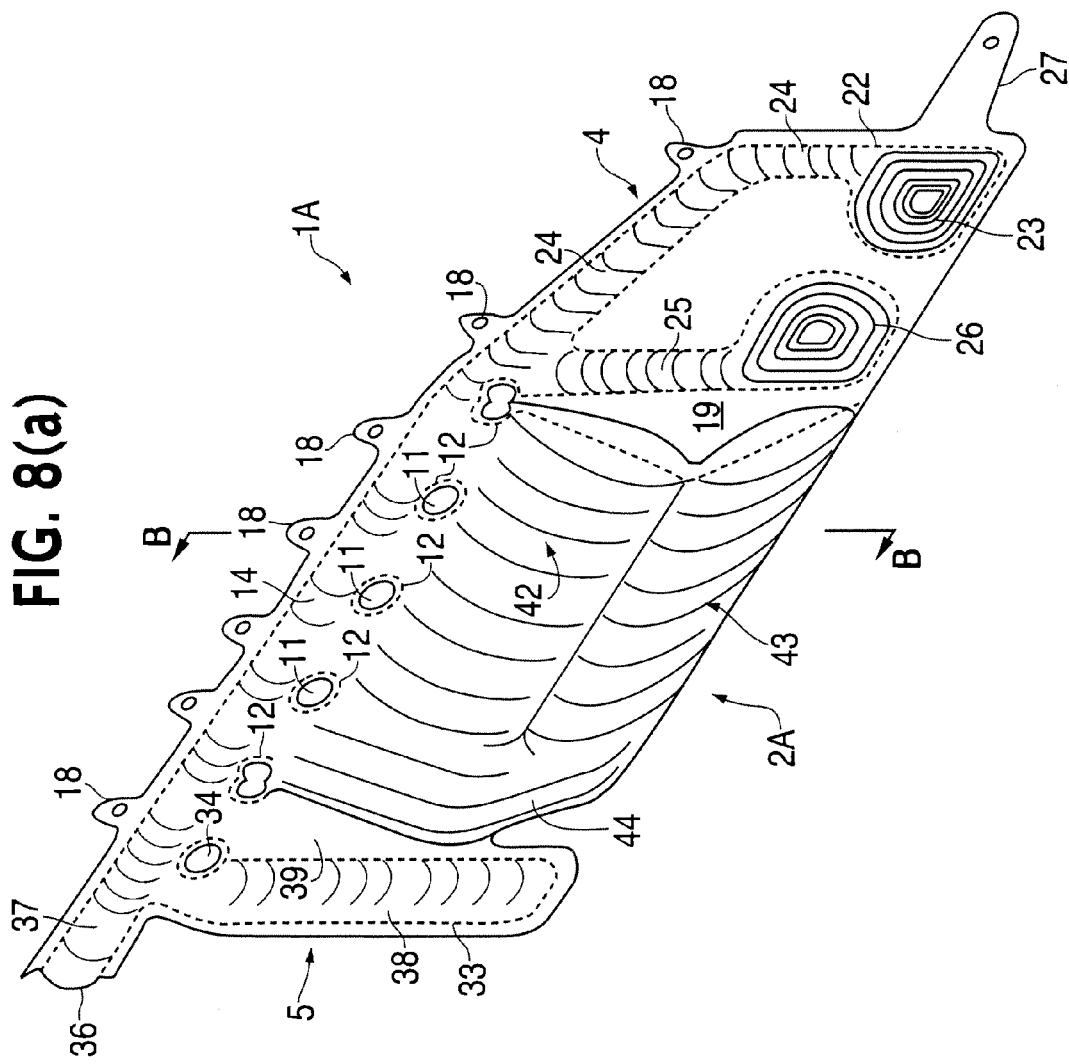
FIGS. 8(a) and 8(b) are explanatory views illustrating another embodiment of the present invention.
Figure 8B:
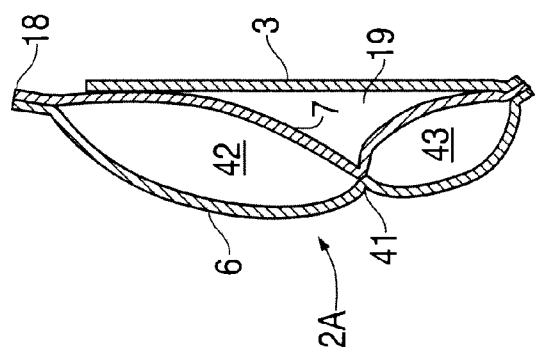

Other embodiments of the present invention will be described below with reference to FIG. 8 and other drawings. FIG. 8(*b*) is a cross-sectional view taken along the line B-B of FIG. 8(*a*).

In an airbag 1A shown in FIGS. 8(*a*) and 8(*b*), a longitudinal intermediate portion of a bag 2A is sewn by a transverse sewing line 41, and chambers 42 and 43 are defined above and below the sewing line 41. The sewing line 41 extends from the front edge of the bag 2A and to a position which is adjacent to the rear portion of the bag 2A. Between the sewing line 41 and the rear edge of the bag 2A, there is defined a communicating portion 44 which communicates the chambers 42 and 43 with each other.

Other constructions of the airbag 1A are the same as those of the airbag 1, and therefore, the same reference numerals are used to designate the same parts.

When the airbag 1A is inflated, the bag 2A and the connection member 3 define a triangular configuration, and the space 19 is defined between the bag 2A and the connection member 3. Therefore, the airbag 1A according to this embodiment accomplishes the same effects as the airbag 1.

While the communicating portion 44 is defined at the rear portion of the bag 2A in FIG. 8, it can be readily understood that the communicating portion 44 can be defined at the front portion of the bag 2A and between the front and rear portions of the bag 2A.

In an airbag 1B shown in FIG. 9, non-inflatable panel parts 46 are installed between the chambers 13 of a bag 2B. The longitudinal intermediate portions of the chamber 13 are decreased in width by semi-circular sewing lines 8B. Other constructions are the same as those of FIG. 6, and, therefore, the same reference numerals are used to designate the same parts.

FIG. 9(*b*) is a cross-sectional view taken along the line B-B of FIG. 9(*a*).

In the airbag 1B, the bag 2B is inflated and bent at the longitudinal intermediate portion, and the space 19 is defined between the bag 2B and the connection member 3. Therefore, the airbag 1B according to this embodiment accomplishes the same effects as the airbag 1. Also, in this embodiment, since the panel parts 46 are installed in the bag 2B and a small number of chambers 13 are defined, even when an inflator having small capacity is employed, the airbag 1B can be quickly inflated.

Figure 10:
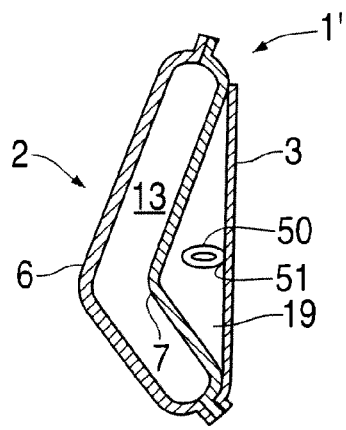
FIG. 10 is an explanatory view illustrating another embodiment of the present invention.

An airbag 1' shown in FIG. 10 is constructed in a manner such that, in the airbag 1, a loop part 50 is formed by a tear seam 51 at a longitudinal intermediate portion of the connection member 3. Other constructions are the same as those of the airbag 1.

The airbag 1' also accomplishes the same effects as the airbag 1. In this preferred embodiment of the present invention, if a tensile force of no less than a predetermined level is applied to the connection member 3 in the longitudinal direction, as the tear seam 51 is torn, the longitudinal length of the connection member 3 increases. In this way, when the tear seam 51 is torn, a shock applied to the vehicle occupant is absorbed.

Figure 11A:
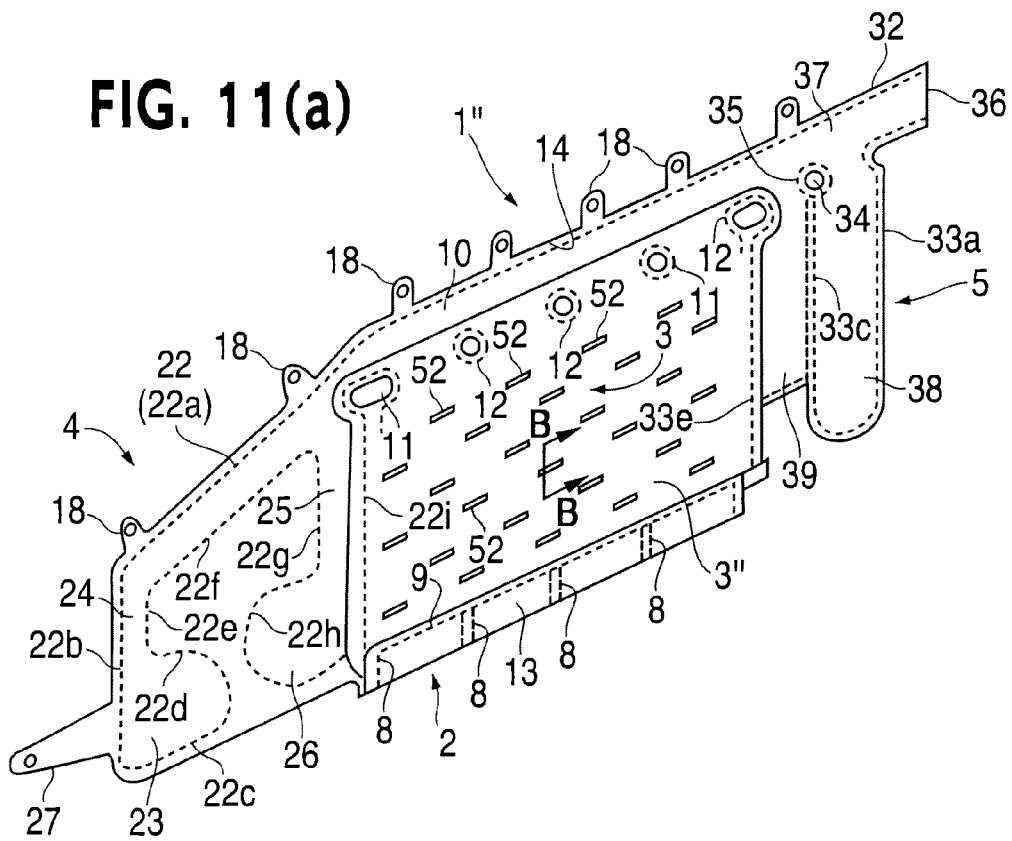
FIGS. 11(a), 11(b) and 11(c) are explanatory views illustrating still another embodiment of the present invention.
Figures 11B, 11C:
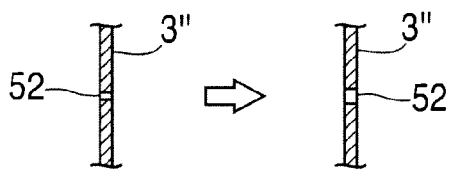

Also, instead of forming the loop part 50 using the tear seam 51, a plurality of short slits 52 may be defined in a connection member 3" of an airbag 1" as shown in FIG. 11.

As shown in FIG. 11(*b*) (which is a cross-sectional view taken along the line B-B of FIG. 11(*a*)) and FIG. 11(*c*), if a tensile force of no less than a predetermined level is applied to the connection member 3" in the longitudinal direction, as the slits 52 are opened, the shock applied to the vehicle occupant is absorbed. Each slit 52 may be closed by a tear seam such that the tear seam can be torn by the application of a tensile force of no less than a predetermined level. Other constructions in FIG. 11(*a*) are the same as those in FIG. 5.

Figure 12A:
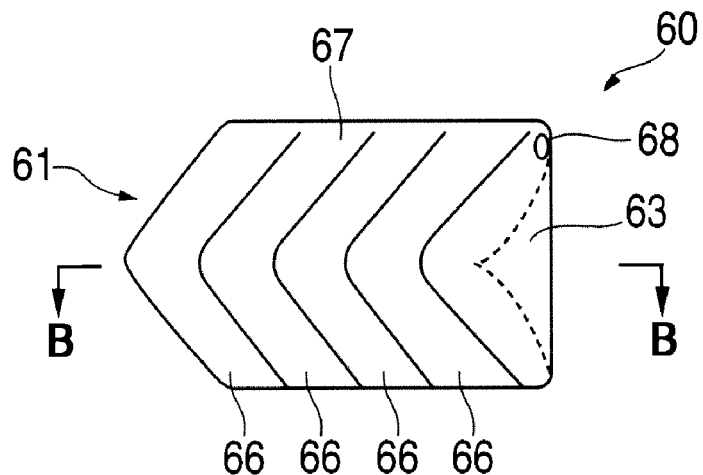
FIGS. 12(a), 12(b), and 12(c) are explanatory views illustrating further another embodiment of the present invention.
Figure 12B:
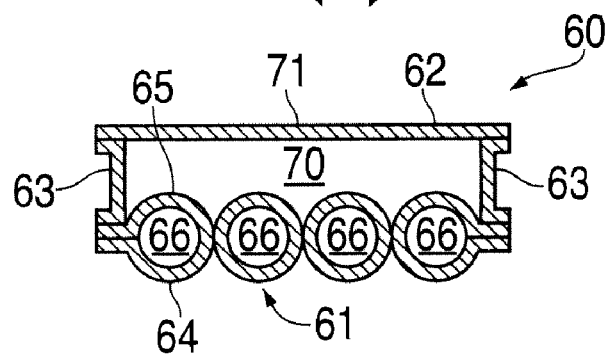
Figure 12C:
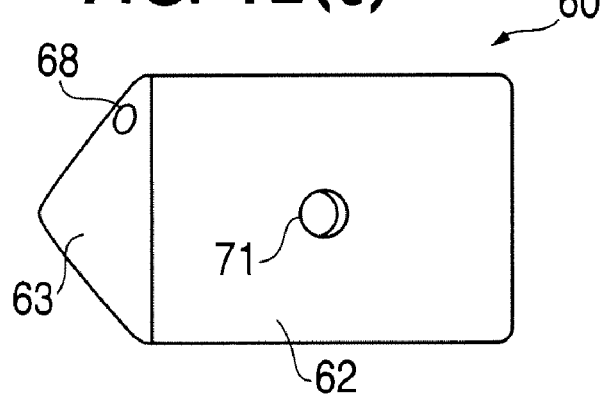

An airbag 60 shown in FIG. 12 comprises a bag 61, a connection member 62 which is positioned on a side of the bag 61, facing the vehicle body, and is composed of a panel for connecting the upper and lower portions of the bag 61 with each other, and side panels 63 serving as front and rear closing members for closing front and rear portions of the airbag 60.

In the bag 61, as in the case of the bag 2, two panels 64 and 65 are sewn to each other along sewing lines to define a plurality of longitudinal chambers 66. A duct 67 is formed along the upper edge of the bag 61, and gas can be supplied through a gas inlet 68. The panels 63 comprise triangular panels which close sides of a space 70 which is defined between the bag 61 and the connection member 62. The space 70 communicates with the atmosphere through a vent hole 71 which is defined in the connection member 62.

Also in this embodiment, the longitudinal intermediate portion of the bag 61 is bent so as to project toward the vehicle occupant. Therefore, the airbag according to this embodiment accomplishes the same effects as those of the aforementioned respective airbags.

Specifically, in this preferred embodiment of the present invention, when the vehicle occupant is brought into contact with the bag 61 to reduce the volume of the space 70, as air existing in the space 70 is discharged through the vent hole 71, the shock applied to the vehicle occupant is absorbed.

While the vent hole 71 is defined in the connection member 62 in FIG. 12, the vent hole 71 may be defined in the side panel 63. Also, in place of the vent hole, at least a portion of the connection member 62 or the side panel 63 may be constructed of a fabric having air permeability.

The above-described embodiments are illustrated and explained by way of examples, and the present invention may have other constructions. For example, a belt may be used in place of the connection member 3. Also, the airbags may be installed at other locations such as between the A pillar, C pillar, D pillar and so forth. Further the airbags may be installed outside of the vehicle, or directly on a seat or the dashboard of a vehicle. A combination of airbags may also be used. Furthermore, the shape of the airbag can vary. The airbag can inflate into a "D" or ">" shape, an "L" shape or a "V" shape, or other similar shape.

Figure 13:
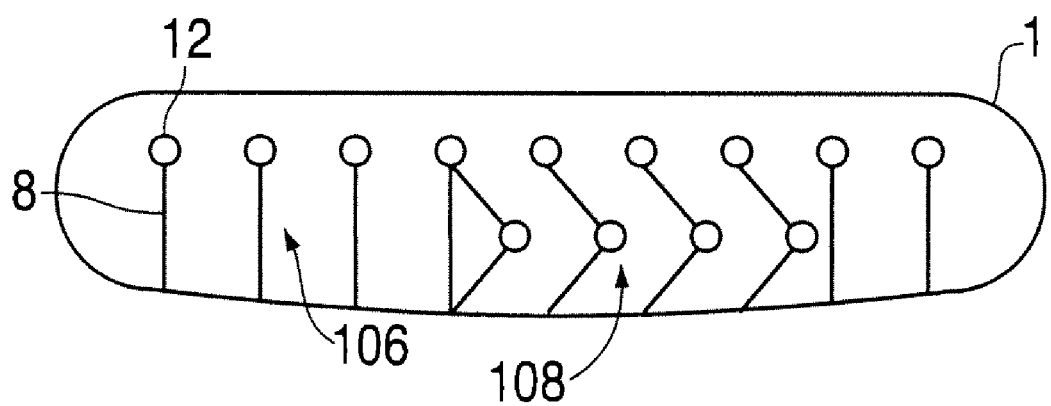
FIG. 13 is a view of an airbag according to another embodiment of the present invention.

According to another embodiment of the present invention, the airbag 1 can include darts or longitudinal seams 8 and circular seams 12 that extend in a curved manner or a bend to form the substantial "D" shape or ">" shape in the airbag 1. In this embodiment, shown in FIG. 13, the airbag 1 includes a combination of generally straight line areas 106 and the curved or bent areas 108 formed by the darts 8 and circular seams 12. The transition area from the straight line area 106 to the curved seam area 108 is open. However, the transition area can also be covered by a fabric sheet or sheets. Further, the transition area between the straight line area 106 to the curved seam area 108 can be formed by airbag chambers.

Figure 14A:
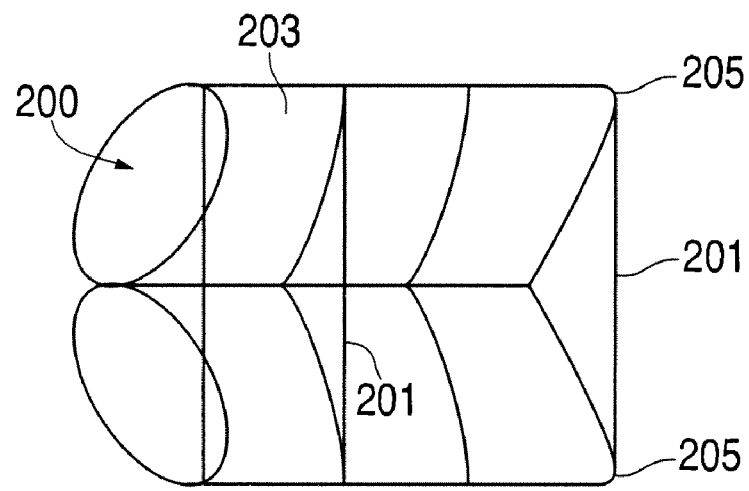
FIGS. 14(a) and 14(b) are views of an airbag according to another embodiment of the present invention.
Figure 14B:
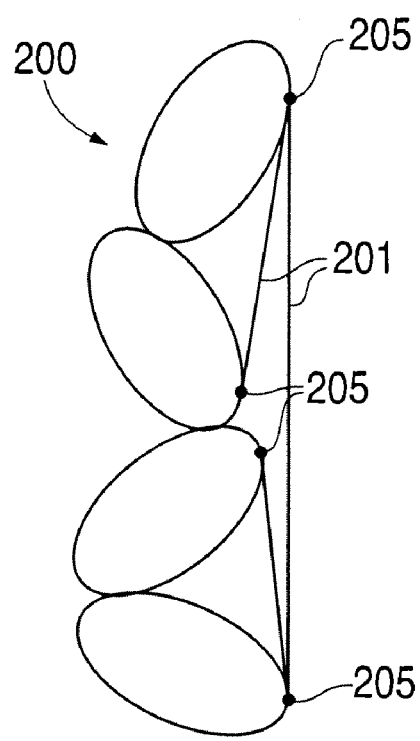

FIGS. 14(*a*) and 14(*b*) show another embodiment of the present invention. The airbag 200 can have tethers 201 as a connection member. The tethers 201 are interconnected among various points along the airbag 200 to form the bent or ">" shape in the airbag 200. The tethers 201 connect to the airbag 200 at various connection points 205. The airbag 200 can have a single kink or bend in each chamber 203 (similar to FIG. 1(*a*)), or the airbag 200 can have multiple kinks or bends, as shown in FIG. 14(*b*). The tethers 201 can be attached to the airbag 200 at two or more places to force the formation of one or more bends or kinks in the airbag 200. The connection member 201 can also comprise a belt or rope or any other suitable device.

Figure 15A:
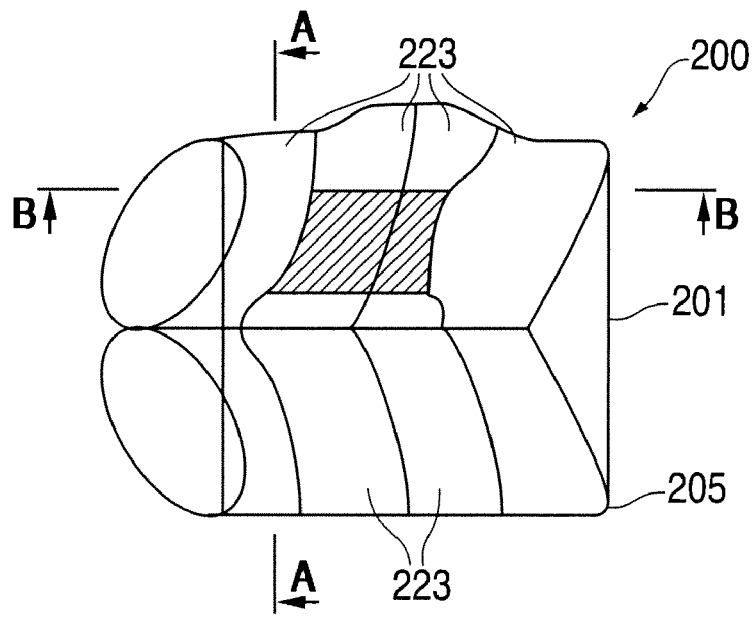
FIGS. 15(a), 15(b) and 15(c) are views of an airbag according to another embodiment of the present invention.
Figure 15B:
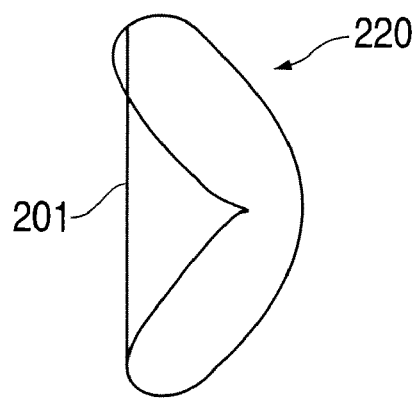
Figure 15C:
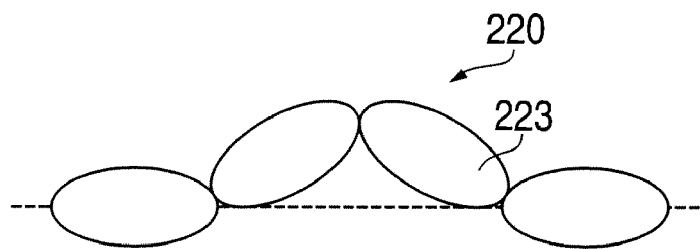

In another embodiment of the present invention, the airbag 220 may have a combination of inter-chamber deformation with chamber deformation. For example, FIGS. 15(*a*), 15(*b*) and 15(*c*) show an airbag 220 with multiple chambers 223. Chambers 223 in the upper center region of the airbag 220 are further deformed to cause the shape shown in FIG. 15(*c*). This inter-deformation and deformation aids in receiving the head H of an occupant during a collision event. The location of the inter-deformed chambers can be located in various positions in the airbag 220 and need not be located as shown in FIG. 15(*a*).

Figure 16A:
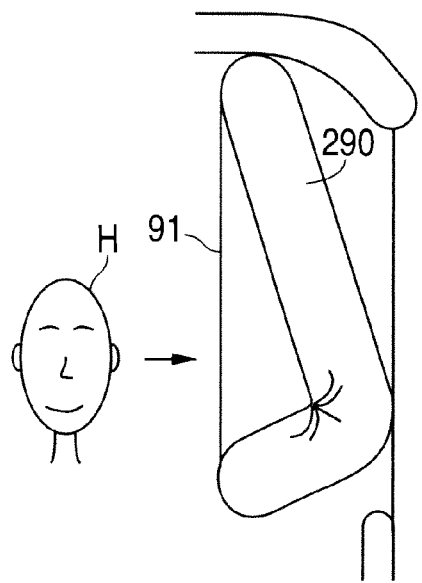
FIGS. 16(a), 16(b) and 16(c) are views of an airbag according to another embodiment of the present invention.
Figure 16B:
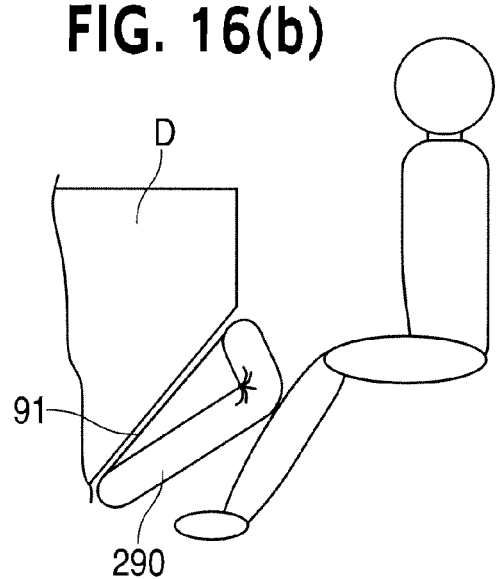
Figure 16C:
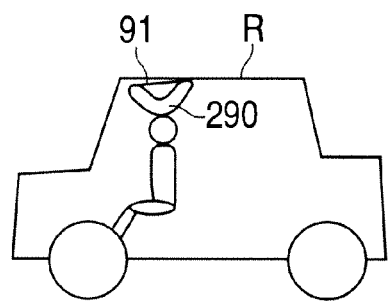

According to another embodiment shown in FIG. 16(*a*), the airbag 290 can have the connection member 91 located facing towards the occupant. Further, the airbag 290 can be positioned in multiple locations inside the vehicle, such as along the lower dashboard D to protect the knees of an occupant, or along the roof line R of a vehicle, as can be seen in FIGS. 16(*b*) and 16(*c*).

Figure 17A:
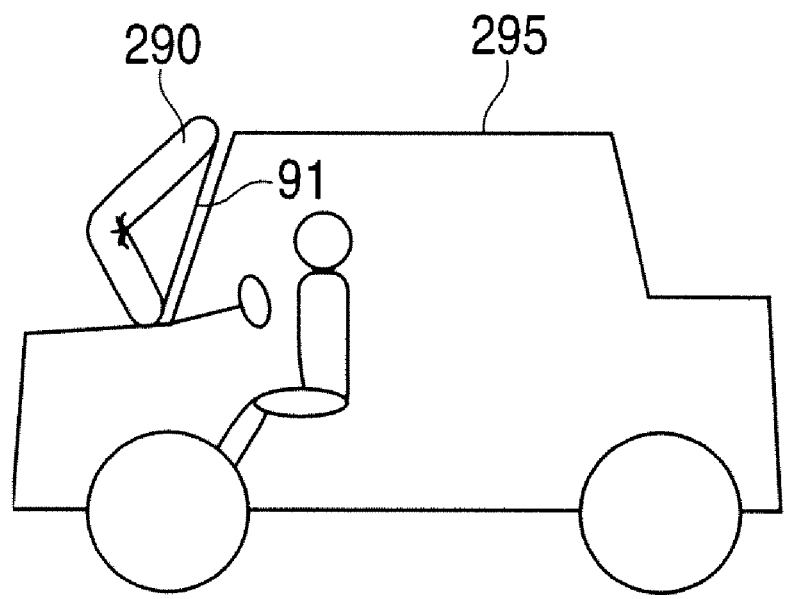
FIGS. 17(a) and 17(b) are views of an airbag according to another embodiment of the present invention.
Figure 17B:
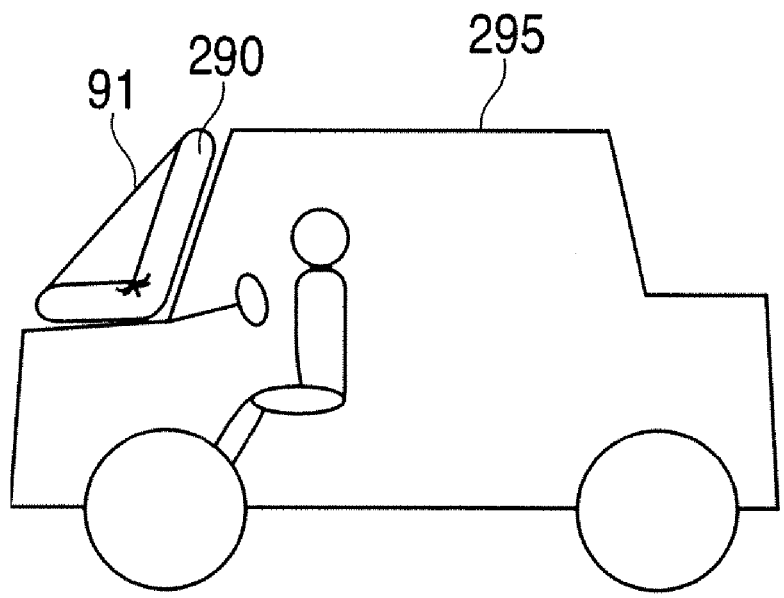

In another embodiment of the present invention shown in FIGS. 17(*a*) and 17(*b*), the airbag 290 can be positioned outside of a vehicle 295, such that a pedestrian or other individual outside of the vehicle can be protected in the case of a collision. The airbag 290 can be positioned with the connection member 91 facing the vehicle 295 or away from the vehicle 295.

Figure 18:
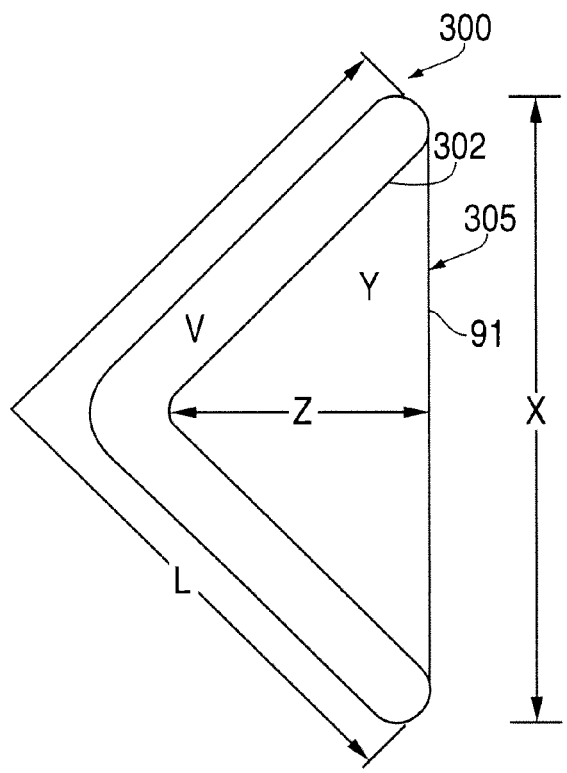
FIG. 18 is a view of an airbag.

In another embodiment of the present invention, the airbag 300 is configured to inflate into a position wherein an enveloped space Y is defined by the first side surface 302 and a plane containing the upper and lower ends of the airbag 305, which can be seen in FIG. 18. The ratio of the volume of the enveloped space Y over the volume V of the inflated airbag 300, according to an embodiment of the present invention, is greater than approximately 1.0. In another embodiment, the ratio is greater than approximately 1.2.

In another embodiment of the present invention, a longitudinal length X of the connection member 91 is smaller than a longitudinal length L of the airbag 300. In an embodiment, the ratio of the longitudinal distance L of the airbag 300 to the longitudinal length X of the connection member 91 is approximately 1.2 or greater. In another embodiment, the ratio of the longitudinal distance L of the airbag 300 to the longitudinal length X of the connection member 91 is approximately 1.25.

In an airbag device of another embodiment, the airbag 300 comprises an effective space factor defined as the stroke length Z divided by the inflation volume V of the airbag 300. The effective space factor of an airbag 300 in an embodiment of the present invention is approximately 7.5. In another embodiment, the airbag 300 comprises an effective space factor greater than 7.5. In an embodiment, a width of each of the plurality of chambers at the intermediate portion of the airbag 300 is smaller than a width of each of the plurality of chambers at the upper and lower ends of the airbag 300.

Figure 19:
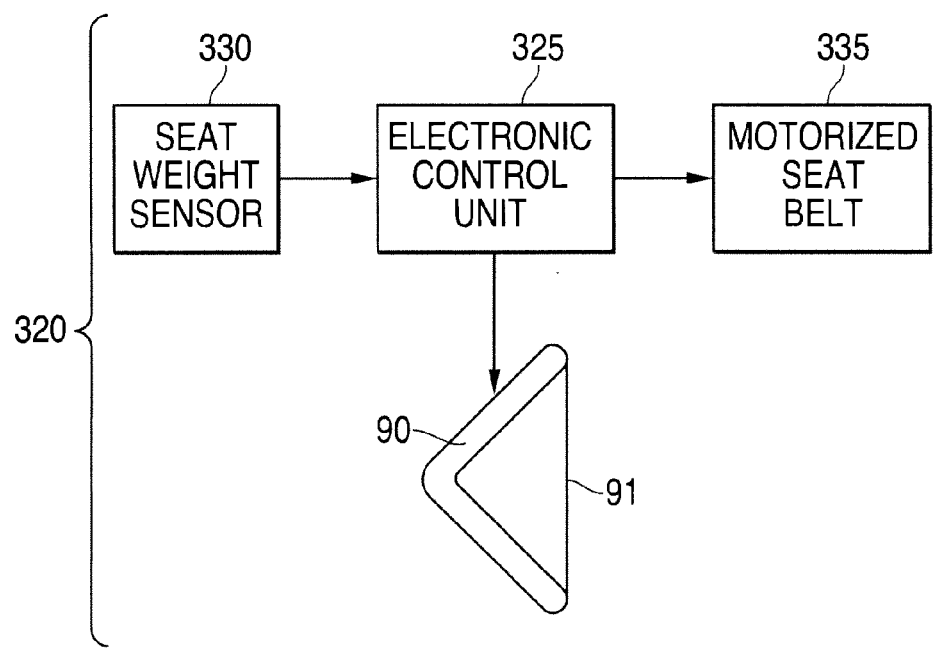
FIG. 19 is a schematic view of an occupant protection system according to an embodiment of the present invention.

In another embodiment, as shown schematically in FIG. 19, the airbag 90 is part of an occupant safety system 320. The occupant safety system 320 includes an Electronic Control Unit 325 configured to determine a vehicle collision and to trigger deployment of the airbag 90. A Seat Weight Sensor 330 can also be included in the occupant safety system 320, which is configured to determine a vehicle occupant's weight and/or position. Additionally, the occupant safety system 320 can also include a Motorized Seat Belt device 335, which can be controlled by the Electronic Control Unit 325.

Figure 20:
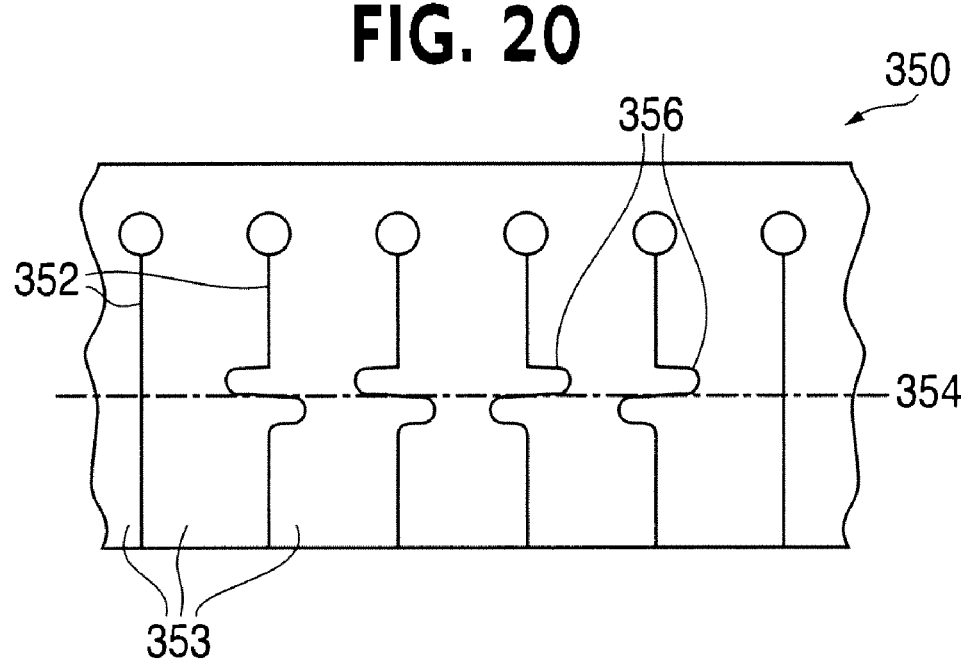
FIG. 20 is a view of an airbag according to another embodiment of the present invention.

FIG. 20 is an example of an embodiment of the current invention in which a bend in the airbag 350 is formed by the shape of the chambers 353 of the airbag 350. For example, the curves of seams 352 may be used to decrease the thickness of a chamber 353, as shown in FIG. 20. This causes a weakening of the airbag 350 in the region of the seam curves 352 and creates a bend in the airbag 350. A bend line 354 is an arrangement of neighboring chambers 353 with weakened zones 356.

Figure 21:
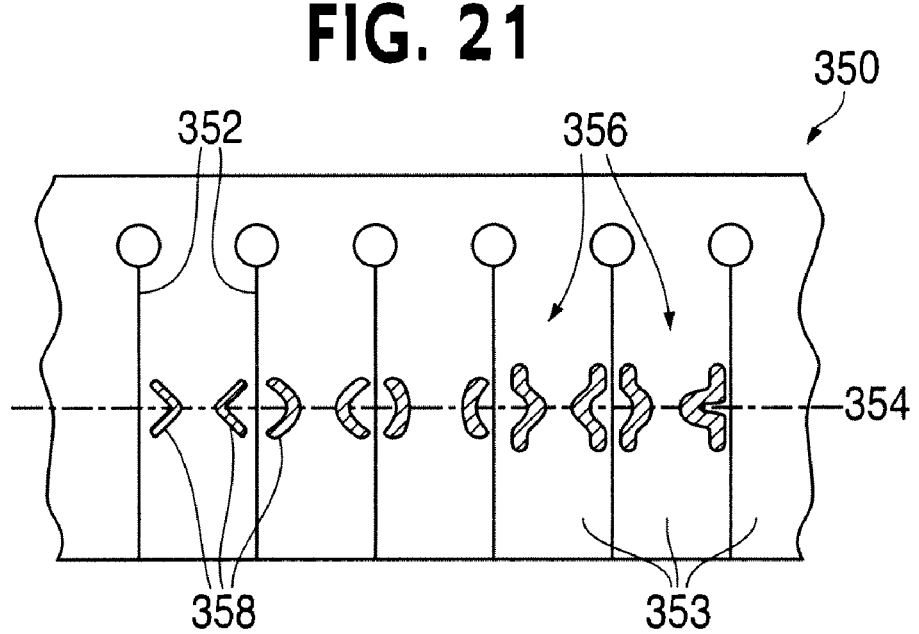
FIG. 21 is a view of an airbag according to another embodiment of the present invention.

FIG. 21 is an embodiment of the current invention in which silicon lines 358 are used to weaken airbag chambers 353. The silicon weakens the airbag 350 by decreasing the diameter of the airbag 350 along a bent line 354. For example, lines of silicon 358 may include strips of silicon or straps of silicon. Silicon based materials may be used, including silicone. During deflation, the silicon lines 358 may fail and fall off of the airbag. For example, the silicon lines 358 may fail by cracking or breaking. Failure of the silicon lines 358 may occur fully, partially, or not at all.

Figure 22:
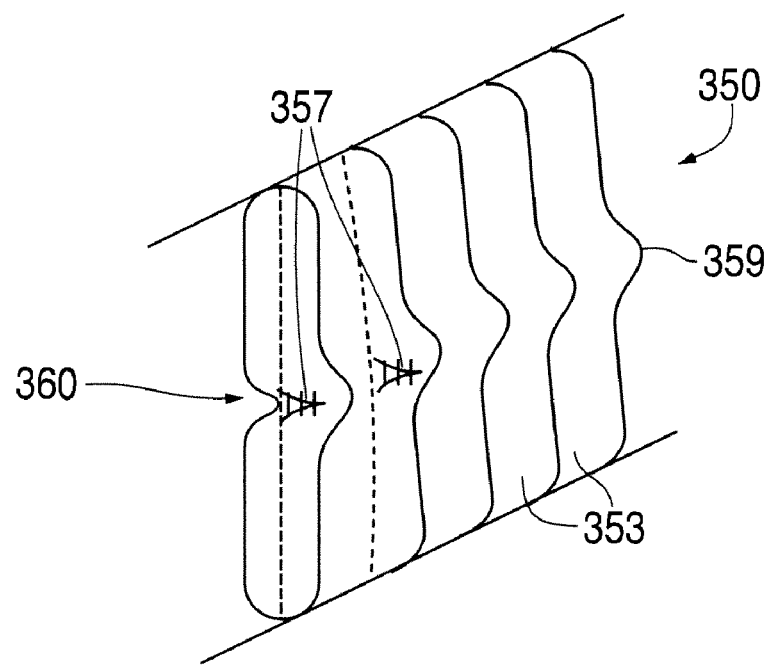
FIG. 22 is a view of an airbag according to another embodiment of the present invention.
Figure 23:
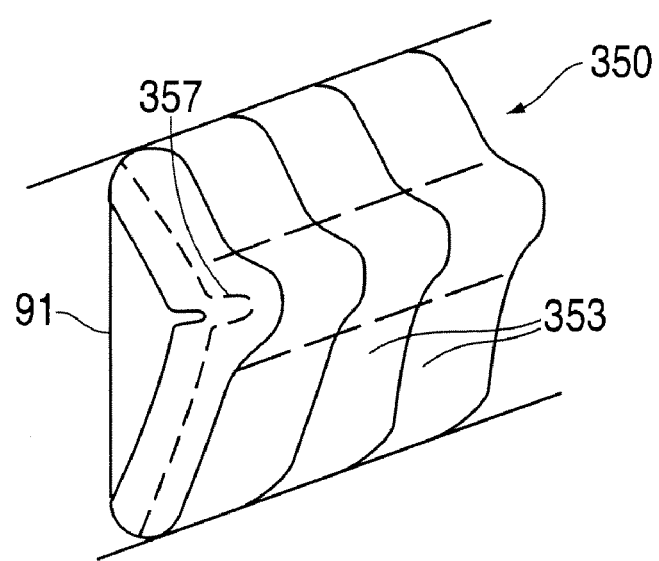
FIG. 23 is a view of an airbag according to another embodiment of the present invention.

FIG. 22 shows another embodiment of the current invention in which seams 357 between airbag chambers 353 may be used to form bends in an airbag 350. For example, seams 357 placed between chambers 353 may be reaped together to form a fold or bent line in the airbag 350. This causes a buckle 359 on one side of the airbag 350 and a dell 360, or valley, on the other side of the airbag 350. A common seam 357 formed in the airbag 350 may be 3-5 cm long. FIG. 23 shows a further embodiment of the present invention that is similar to the airbag of FIG. 22 but also includes a connection member 91 to enhance airbag 350 bending or buckling.

Figure 24:
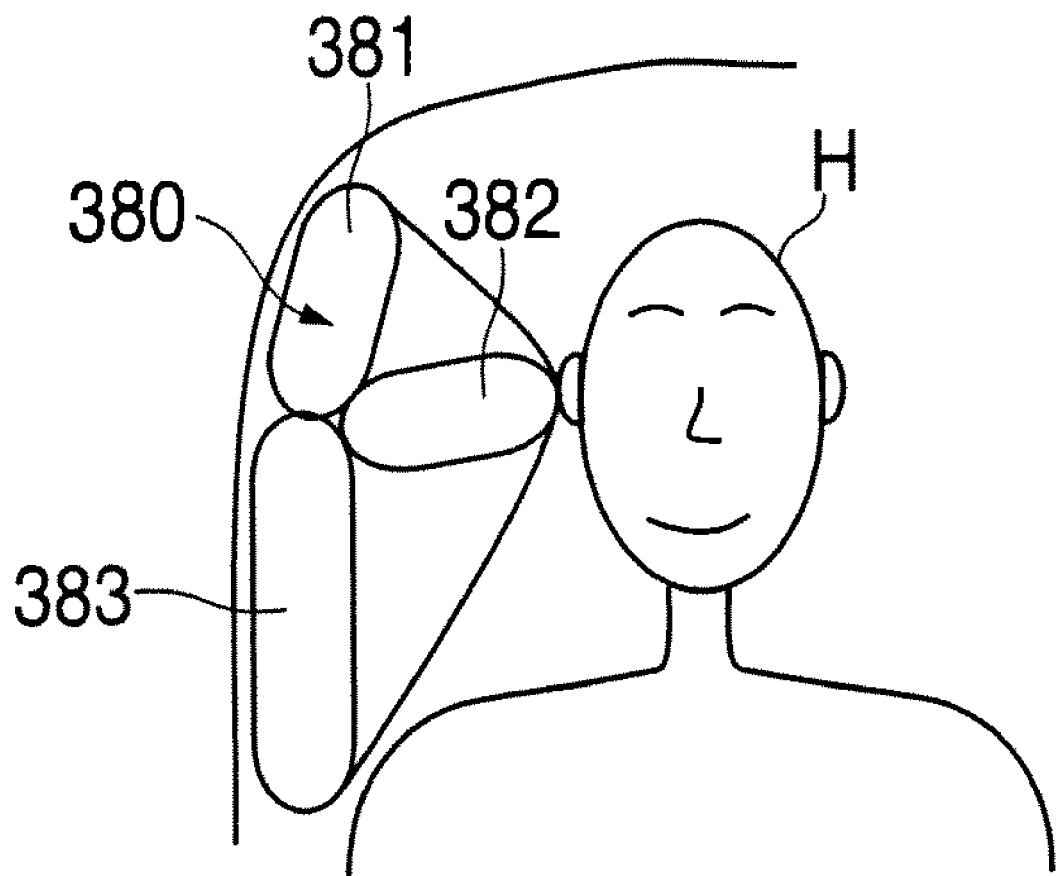
FIG. 24 is a view of an airbag in a "flower" shape according to another embodiment of the present invention.

FIG. 24 shows another embodiment of the present invention in which an airbag 380 with a flower shape is used. For example, three or more chambers 381, 382, 383 may be used to form the "petals" of a flower. In the example shown in FIG. 24, the chambers 381, 382, 383 form a double D-shape, with the middle chamber 382 serving as an absorber element for forces along the longitudinal direction of the middle chamber 382.

Figure 25:
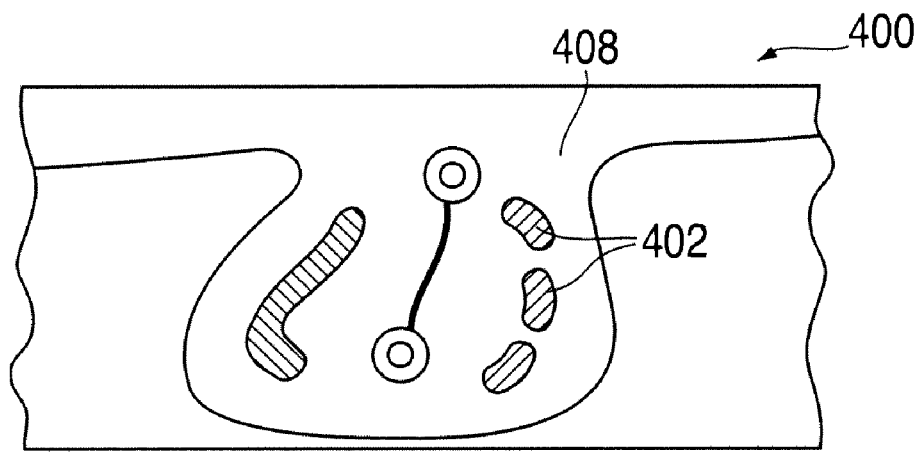
FIG. 25 is a view of an airbag according to another embodiment of the present invention.
Figure 26:
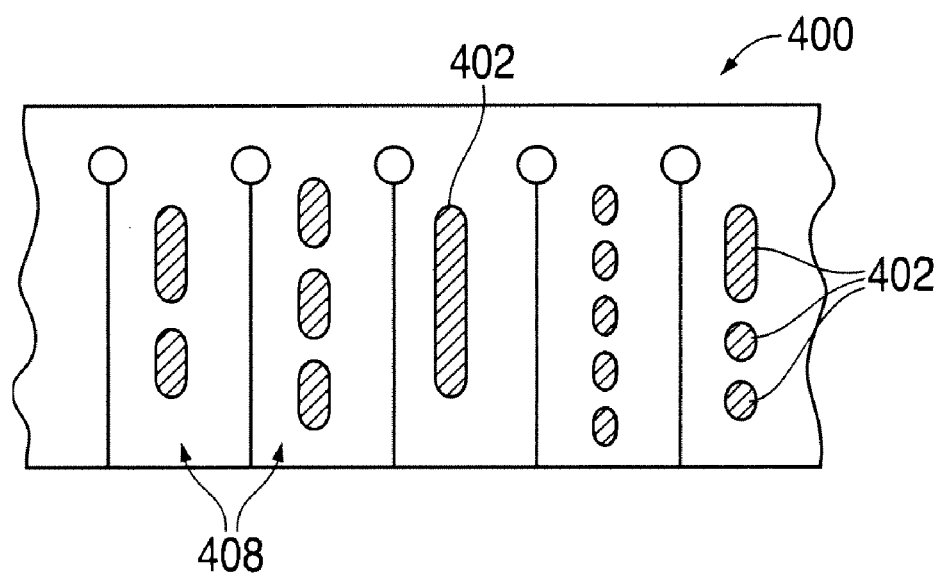
FIG. 26 is a view of an airbag according to another embodiment of the present invention.

In an embodiment of the present invention, as shown in FIG. 25, silicon strips 402 are used to separate airbag chambers 408 into smaller chambers. In the example shown in FIG. 25, silicon strips 402 separate a chamber 408 into two smaller chambers with less volume. This causes a fast airbag 400 deployment and fast positioning of the airbag 400. One or more silicon strips 402 may be used and the strips 402 may be parallel or non-parallel. For example, lines of silicon 402 may include strips of silicon or straps of silicon. Silicon based materials may be used, including silicone. As pressure increases inside an airbag 400 during deployment, the silicon strips 402 may fail and allow the airbag 400 to inflate to full volume. For example, the silicon lines 402 may fail by cracking or breaking. Failure of the silicon lines 402 may occur fully, partially, or not at all. In a further embodiment shown in FIG. 26, silicon strips 402 are used to further divide airbag chambers 408.

Figure 27A:
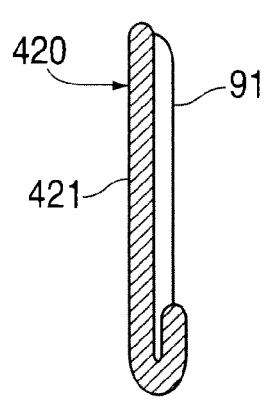
FIGS. 27(a)-27(f) are views of an airbag with pre-folds according to another embodiment of the present invention.
Figure 27D:
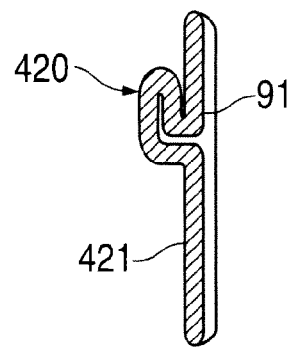
Figure 27B:
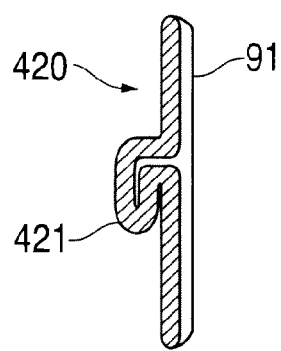
Figure 27E:
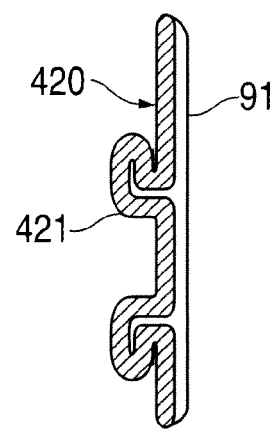
Figure 27C:
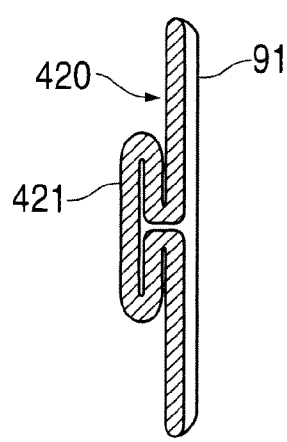
Figure 27F:
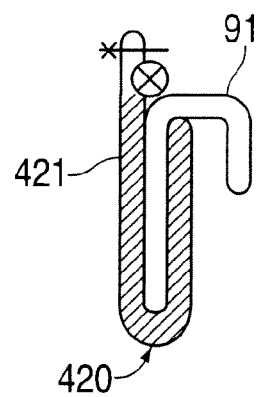
Figure 28A:
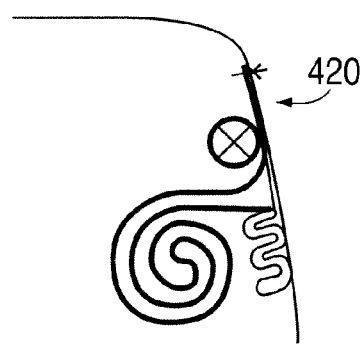
FIGS. 28(a)-28(f) are views of an airbag with pre-folds and following folding variations according to another embodiment of the present invention.
Figure 28B:
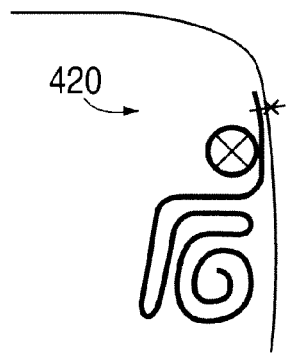
Figure 28C:
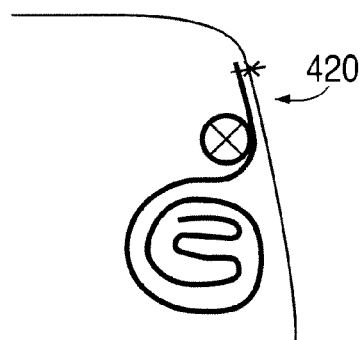
Figure 28D:
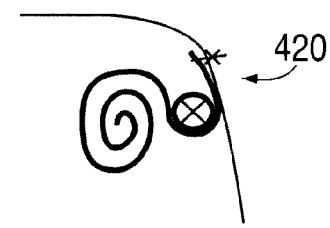
Figure 28E:
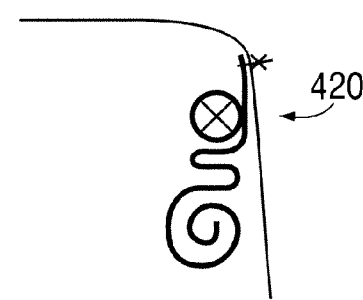
Figure 28F:
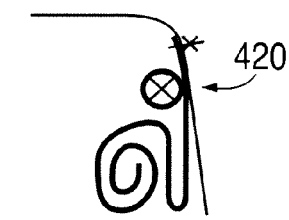

In another embodiment of the present invention, an airbag 420 is pre-folded before the process of folding so that length of an airbag 420 and a tension layer 91 are equalized or so that the airbag 420 is arranged with two sides of equal length. To achieve equivalent lengths, one or more pre-folds may be necessary to obtain a flat layered package. FIG. 27*f* illustrates an airbag 420 with an airbag layer 421 and a tensioning layer 91. FIGS. 27*a*, 27*b*, 27*c*, 27*d*, and 27*e* illustrate various examples of pre-folds for airbags 420.

In another embodiment of the present invention, an airbag 420 is pre-folded prior to packaging the airbag 420 by using a rolled fold, zig-zag fold, plus-1, or a combination of different pre-fold types. FIGS. 28a, 28b, 28c, 28d, 28e, and 28f illustrate various examples of pre-folds and pre-fold combinations for airbags 420.

Figure 29A:
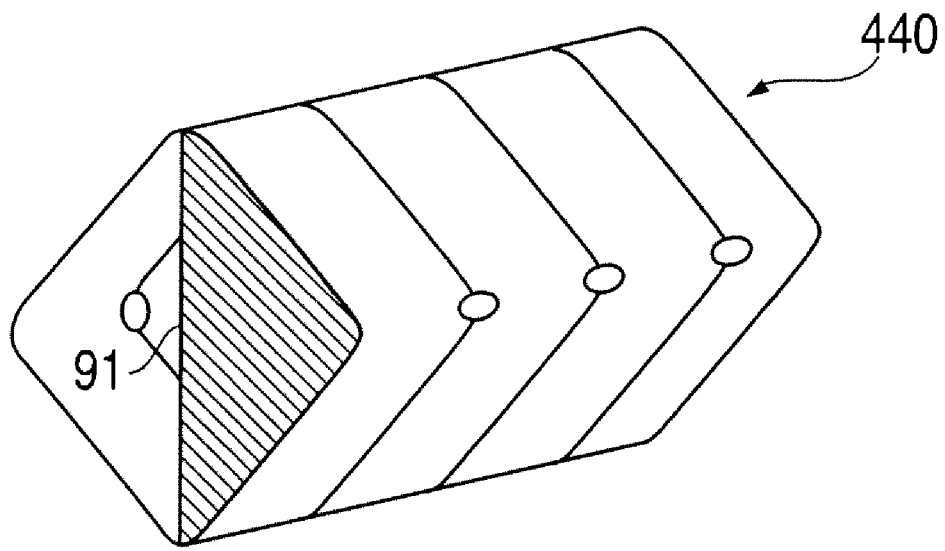
FIGS. 29(a) and 29(b) are views of an airbag in a "double D" shape according to another embodiment of the present invention.
Figure 29B:
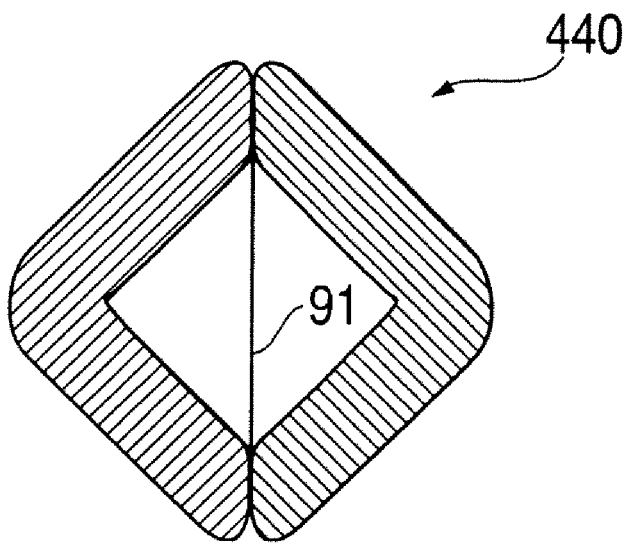

FIG. 29a shows an example of another embodiment of the present invention in which an airbag 440 with a double-sided D-shape is used. For example, the airbag 440 may be formed by two D-shaped airbags. A double-sided D-shaped airbag may include a tensioning layer 91 in its middle. FIG. 29b shows an end view of a double-sided D-shaped airbag 440.

Figure 30:
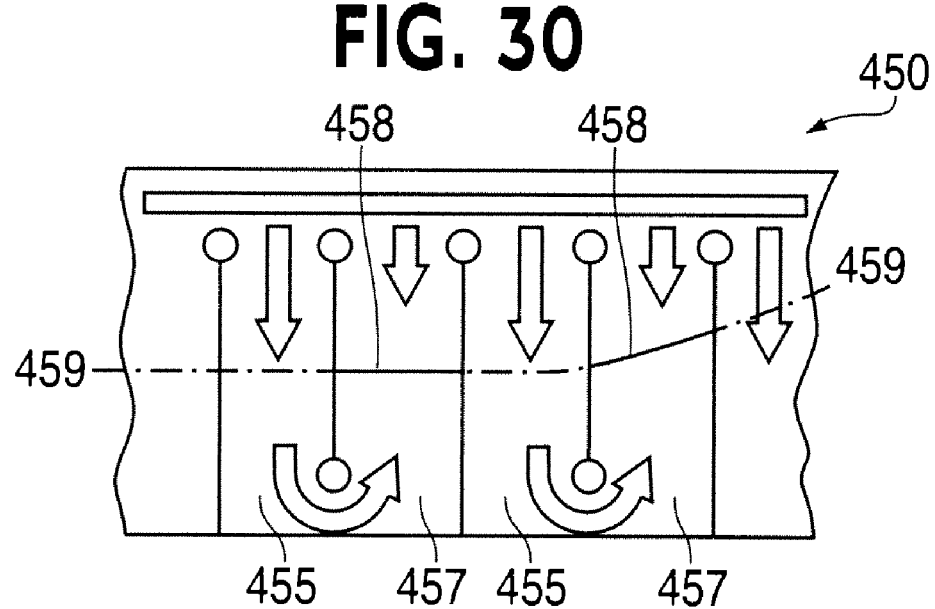
FIG. 30 is a view of an airbag according to another embodiment of the present invention.

In another embodiment of the present invention, primary airbag chambers 455 may be connected to secondary airbag chambers 457 so that the secondary chambers 457 are filled by gas passing from the primary chambers 455. In the example shown in FIG. 30, a seam 458 is used to create secondary chambers 457 that are filled from below by gas flowing from primary chambers 455. Such arrangements allow for fast positioning and the use of seams 458 also allow bending of the airbag 450 along a bent line 459. Bending of the airbag 450 due to the seams 458 may be sufficient to shape the bag 450 without further bending means.

Figure 31:
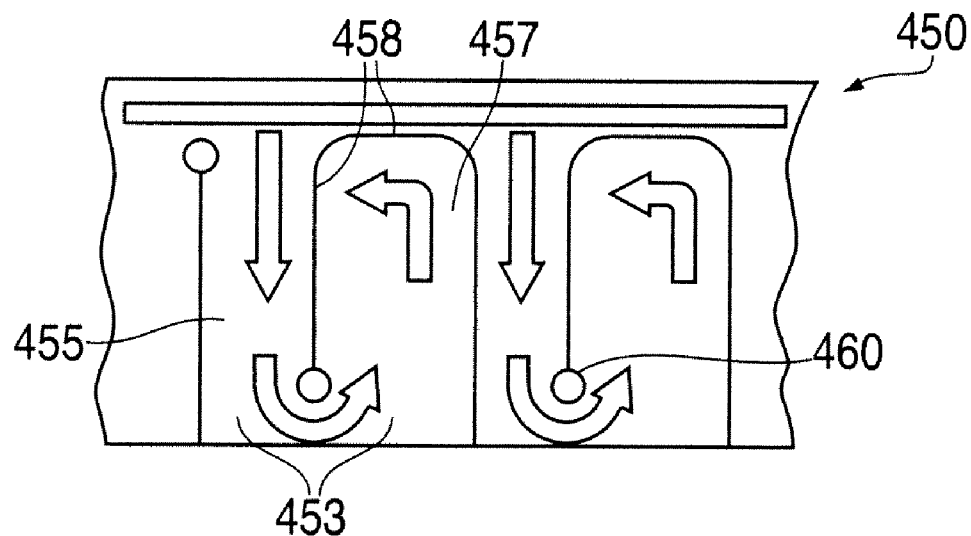
FIG. 31 is a view of an airbag according to another embodiment of the present invention.

FIG. 31 shows a further embodiment of the present invention that uses seams 458 positioned near the top of the airbag 450 to divide chambers 453 into primary 455 and secondary 457 chambers. Such designs allow for fast positioning with fewer circular seams 460 in the upper region of the airbag 450. A bent line may be created via horizontal tensioning or by any of the methods described above.

Figure 32A:
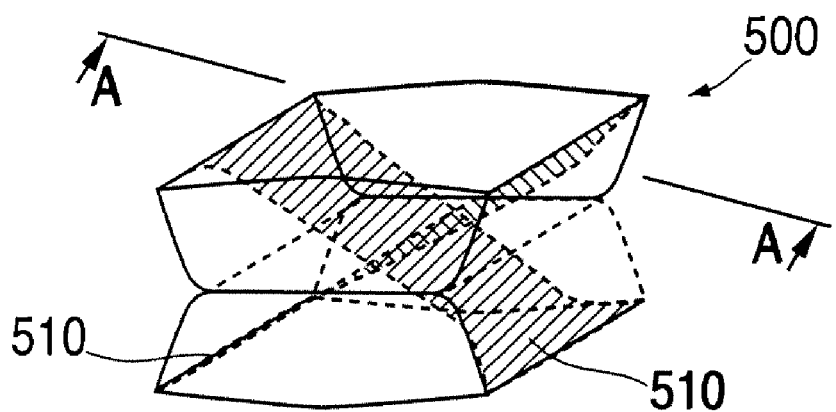
FIGS. 32(a) and 32(b) are views of an airbag according to another embodiment of the present invention.
Figure 32B:
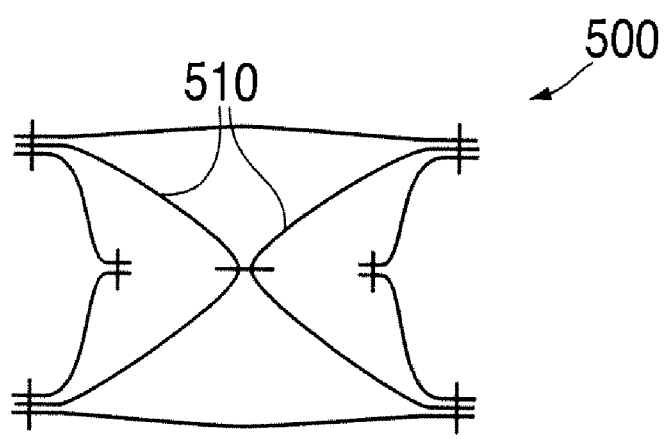

In another embodiment of the present invention, inner tether layers 510 may be used to shape an airbag 500. In the example shown in FIG. 32a, a double-V fabric is seamed in the middle of an airbag 500 to form the airbag 500 into an X-shape. The double-V fabric, or X-tether 510, may be sewn together with the existing seams at the edges. Such inner tethers 510 may be used to limit the extension of the airbag 500. FIG. 32b shows an end-view of a cross-section of an airbag 500 with an X-tether 510.

Figure 33A:
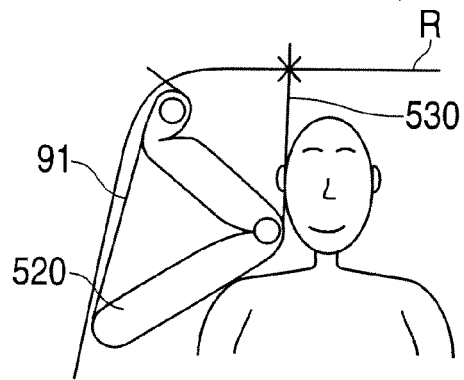
FIGS. 33(a)-33(c) are views of an airbag with a strap attached to the roof line of a vehicle according to another embodiment of the present invention.
Figure 33B:
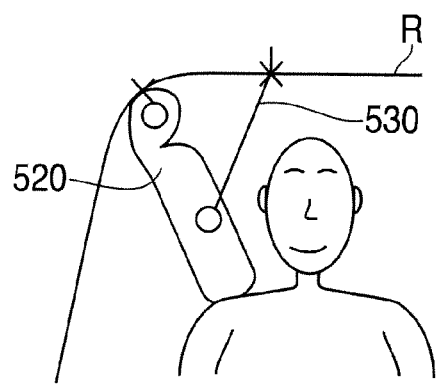
Figure 33C:
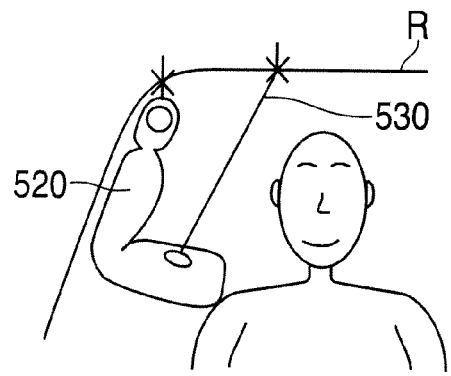

In another embodiment of the present invention, a strap 530 that is fixed to a point on a vehicle is used. For example, a strap 530 may be fixed to the roof R inside of a vehicle. In the embodiment illustrated in FIG. 33a, a strap 530 is fixed to the roof R of a vehicle and to an airbag 520 with a connection member 91. In the embodiment illustrated in FIG. 33b, an airbag 520 without a bend or connection member is attached to a strap 530 that is fixed to the inside roof R of a vehicle. In the embodiment shown in FIG. 33c, an airbag 520 without bent straps at its lower edge is attached to a strap 530 that is fixed to the inside roof R of a vehicle. Other variations may be achieved through direct protection of a strap 530, through positioning of the airbag 520, or combinations of the methods described above.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag device comprising:
    a side airbag having first and second side surfaces, upper and lower ends and an intermediate portion, the side airbag being configured to deploy downwardly toward a vehicle occupant; and
    a member connecting the upper and lower ends of the side airbag,
    wherein the side airbag is configured to inflate into a position wherein an enveloped space is defined by the first side surface and a plane containing the member,
    wherein, after inflation of the side airbag, the member is configured to increase in length if a predetermined level of force is applied to the member, and
    wherein the member comprises a loop part adjacent a tearable portion of the member configured to rupture when the predetermined level of force is applied to the member.

2. The airbag device of claim 1, wherein the predetermined level of force is a tensile force applied to the member.

3. The airbag device of claim 1, wherein the tearable portion is held by a tear seam.

4. The airbag device of claim 1, wherein the loop part is located at a longitudinal intermediate portion of the member.

5. The airbag device of claim 1, wherein a ratio of volume of the enveloped space over volume of the inflated airbag is greater than approximately 1.2.

6. The airbag device of claim 1, wherein a longitudinal length of the member is smaller than a longitudinal length of the airbag.

7. An airbag device comprising:
    a side airbag having first and second side surfaces, upper and lower ends and an intermediate portion, the side airbag being configured to deploy downwardly toward a vehicle occupant; and
    a member connecting the upper and lower ends of the side airbag,
    wherein the side airbag is configured to inflate into a position wherein an enveloped space is defined by the first side surface and a plane containing the member,
    wherein, after inflation of the side airbag, the member is configured to increase in length if a predetermined level of force is applied to the member,
    wherein the member has a slit configured to open to a larger area when the predetermined level of force is applied to the member, and
    wherein the slit is initially closed by a tear seam upon inflation of the airbag before application of the predetermined level of force.

8. An airbag device comprising:
    a side airbag having first and second side surfaces, upper and lower ends and an intermediate portion, the side airbag being configured to deploy downwardly toward a vehicle occupant; and
    a member connecting the upper and lower ends of the side airbag,
    wherein the side airbag is configured to inflate into a position wherein an enveloped space is defined by the first side surface and a plane containing the member,
    wherein the airbag comprises a first panel and a second panel connected along connecting lines to form a plurality of chambers therebetween, and
    wherein one chamber of the plurality of chambers has an area of decreased width such that the one chamber bends at the area of decreased width upon inflation.

9. The airbag device of claim 8, wherein, after inflation of the side airbag, the member is configured to increase in length if a predetermined level of force is applied to the member, and wherein the member has a slit configured to open to a larger area when the predetermined level of force is applied to the member.

10. The airbag device of claim 8, wherein, after inflation of the side airbag, the member is configured to increase in length if a predetermined level of force is applied to the member, and wherein the member has a plurality of slits configured to open to larger areas when the predetermined level of force is applied to the member.

11. An airbag device comprising:
    a side airbag having first and second side surfaces, upper and lower ends and an intermediate portion, the side airbag being configured to deploy downwardly toward a vehicle occupant; and
    a member connecting the upper and lower ends of the side airbag,
    wherein the side airbag is configured to inflate into a position wherein an enveloped space is defined by the first side surface and a plane containing the member,
    wherein the airbag comprises a first panel and a second panel connected along connecting lines to form a plurality of chambers therebetween, and
    wherein a portion of the chambers have areas of decreased width such that the portion of chambers bends at the areas of decreased width upon inflation along a bending line.

12. The airbag device of claim 11, wherein the connecting lines are sewing seams, and wherein the areas of decreased width are caused by curves in the sewing seams dividing the chambers in the portion of the chambers.

13. The airbag device of claim 11, wherein the bending line has a first end at a front side vertically lower than a second end at a rear side.

14. The airbag device of claim 11, wherein the areas of decreased width are caused by a plurality of circular or semi-circular sewing line portions located at points where the bending line intersects at the connecting lines dividing the chambers in the portion of the chambers.

15. The airbag device of claim 14, wherein the plurality of circular or semi-circular sewing line portions decrease in vertical height as the bending line approaches a front side.

16. A vehicle, comprising:
    a vehicle body; and
    an airbag device comprising:
        a side airbag having first and second side surfaces, upper and lower ends and an intermediate portion, the side airbag being configured to deploy downwardly toward a vehicle occupant; and
        a member connecting the upper and lower ends of the side airbag,
    wherein the side airbag is configured to inflate into a position wherein an enveloped space is defined by the first side surface and a plane containing the member,
    wherein, after inflation of the side airbag, the member is configured to increase in length if a predetermined level of force is applied to the member, and
    wherein the member comprises a loop part adjacent a tearable portion of the member configured to rupture when the predetermined level of force is applied to the member.

17. The vehicle of claim 16, wherein the airbag device is positioned in a roof of the vehicle.

18. A vehicle, comprising:
    a vehicle body; and
    an airbag device comprising:
        a side airbag having first and second side surfaces, upper and lower ends and an intermediate portion, the side airbag being configured to deploy downwardly toward a vehicle occupant; and
        a member connecting the upper and lower ends of the side airbag,
    wherein the side airbag is configured to inflate into a position wherein an enveloped space is defined by the first side surface and a plane containing the member,
    wherein the airbag comprises a first panel and a second panel connected along connecting lines to form a plurality of chambers therebetween, and
    wherein a portion of the chambers have areas of decreased width such that the portion of chambers bends at the areas of decreased width upon inflation along a bending line.

19. The vehicle of claim 18, wherein, after inflation of the side airbag, the member is configured to increase in length if a predetermined level of force is applied to the member, and
    wherein the member has a slit configured to open to a larger area when the predetermined level of force is applied to the member.

20. The vehicle of claim 18, wherein the connecting lines are sewing seams, and wherein the areas of decreased width are caused by curves in the sewing seams dividing the chambers in the portion of the chambers.

21. The vehicle of claim 18, wherein the areas of decreased width are caused by a plurality of circular or semi-circular sewing line portions located at points where the bending line intersects at the connecting lines dividing the chambers in the portion of the chambers.

22. The vehicle of claim 21, wherein the plurality of circular or semi-circular sewing line portions decrease in vertical height as the bending line approaches a front side.

23. A vehicle, comprising:
    a vehicle body; and
    an airbag device comprising:
        a side airbag having first and second side surfaces, upper and lower ends and an intermediate portion, the side airbag being configured to deploy downwardly toward a vehicle occupant; and
        a member connecting the upper and lower ends of the side airbag,
    wherein the side airbag is configured to inflate into a position wherein an enveloped space is defined by the first side surface and a plane containing the member, and
    wherein, upon deployment, the airbag inflates into a position such that the member faces the vehicle body and contact between the member and the vehicle occupant is prevented.

* * * * *